(12) United States Patent
Zheludev et al.

(10) Patent No.: US 11,187,518 B2
(45) Date of Patent: Nov. 30, 2021

(54) METHOD AND APPARATUS FOR SUPER-RESOLUTION OPTICAL METROLOGY

(71) Applicants: University of Southampton, Southampton (GB); Nanyang Technological University

(72) Inventors: Nikolay Ivanovich Zheludev, Southampton (GB); Guanghui Yuan, Singapore (SG)

(73) Assignees: University of Southampton, Southampton (GB); Nanyang Technological University, Singapore (SG)

( * ) Notice: Subject to any disclaimer, the term of this patent is extended or adjusted under 35 U.S.C. 154(b) by 154 days.

(21) Appl. No.: 16/676,578

(22) Filed: Nov. 7, 2019

(65) Prior Publication Data

US 2021/0140755 A1    May 13, 2021

(51) Int. Cl.
*G01B 9/02* (2006.01)

(52) U.S. Cl.
CPC ...... *G01B 9/02011* (2013.01); *G01B 9/02034* (2013.01)

(58) Field of Classification Search
CPC ............ G01B 9/02011; G01B 9/02034; G01B 2290/70
See application file for complete search history.

(56) References Cited

U.S. PATENT DOCUMENTS

| | | |
|---|---|---|
| 9,606,415 B2 | 3/2017 | Zheludev et al. |
| 2013/0235180 A1* | 9/2013 | Rogers ............... G02B 21/0084 348/79 |

(Continued)

OTHER PUBLICATIONS

Bomzon, et al., *Space-variant Pancharatnam-Berry phase optical elements with computer-generated subwavelength gratings*, Optical Engineering Laboratory, Faculty of Mechanical Engineering, Technion-Israel Institute of Technology Optics Letters, vol. 27, No. 13, pp. 1141-1143, Haifa 32000, Israel, Jan. 22, 2002.

Lin, et al., *Dielectric gradient metasurface optical elements*, Science (print ISSN 0036-8075; online ISSN 1095-9203), American Associate for the Advancement of Science, Research, Reports, Applied Optics, Washington, D.C., Jul. 18, 2014, http://science.sciencemag.org/.

(Continued)

*Primary Examiner* — Hwa Andrew Lee
(74) *Attorney, Agent, or Firm* — Renner, Otto, Boisselle & Sklar, LLP

(57) ABSTRACT

A method of determining a displacement comprises: generating an interferometric superoscillatory field from coherent electromagnetic radiation, the interferometric superoscillatory field comprising an interference pattern between a reference field and a superoscillatory field; detecting with a detector a first set of intensity distributions of the interferometric superoscillatory field, each intensity distribution from a different polarisation state of the electromagnetic radiation; detecting with the detector a second set of intensity distributions of the interferometric superoscillatory field, each intensity distribution from the same polarisation states of the electromagnetic radiation as the first set of intensity distributions; extracting a first local wavevector distribution from the first set of intensity distributions and a second local wavevector distribution from the second set of intensity distributions; comparing the first local wavevector distribution and the second local wavevector distribution to identify any change in position of one or more features in the local wavevector distributions; and ascertaining that a lateral displacement has occurred between the interferometric superoscillatory field and the detector if a change in position is identified.

19 Claims, 11 Drawing Sheets

(56) References Cited

U.S. PATENT DOCUMENTS

2016/0109811 A1* 4/2016 Menon ............... G03F 7/70466
                                                       355/67
2018/0246307 A1* 8/2018 Rogers ............... G02B 21/0068

OTHER PUBLICATIONS

Rogers, et al., *Optical super-oscillations: sub-wavelength light focusing and super-resolution imaging*, IOP Publishing, IOP ebooks, Journal of Optics, vol. 15, No. 9, pp. 1-23, Sep. 10, 2013.

Rogers, et al., *Optimising superoscillatory spots for far-field super-resolution imaging*, Optics Express, Research Article, vol. 26, No. 7, Optics Express 8095, Optical Society of America under the terms of the OSA Open Access Publishing Agreement, Mar. 20, 2018.

Yuan, et al., *Quantum super-oscillation of a single photon*, Light: Science & Application (2016) 5, e16127; doi:10.1038/lsa.2016.127, published online Aug. 26, 2016.

Rogers, et al., *A super-oscillatory lens optical microscope for subwavelength imaging*, Letters, Nature Materials, vol. 11, DOI: 10.1038/NMAT3280, pp. 433-435, May 2012.

Yuan, et al., *"Plasmonics" in free space: observation of giant wavevectors, vortices, and energy backflow in superoscillatory optical fields*, Light: Science & Application (2019)8:2, Official journal of the CIOMP 2047-7538, Article, Open Access, https://doi.org/10.1038/s41377-018-0112-z, pp. 1-9, Jan. 3, 2019.

Nature Conference on Nanophotonics and Integrated Photonics, Nov. 9-11, 2018, Nanjing, China.

* cited by examiner

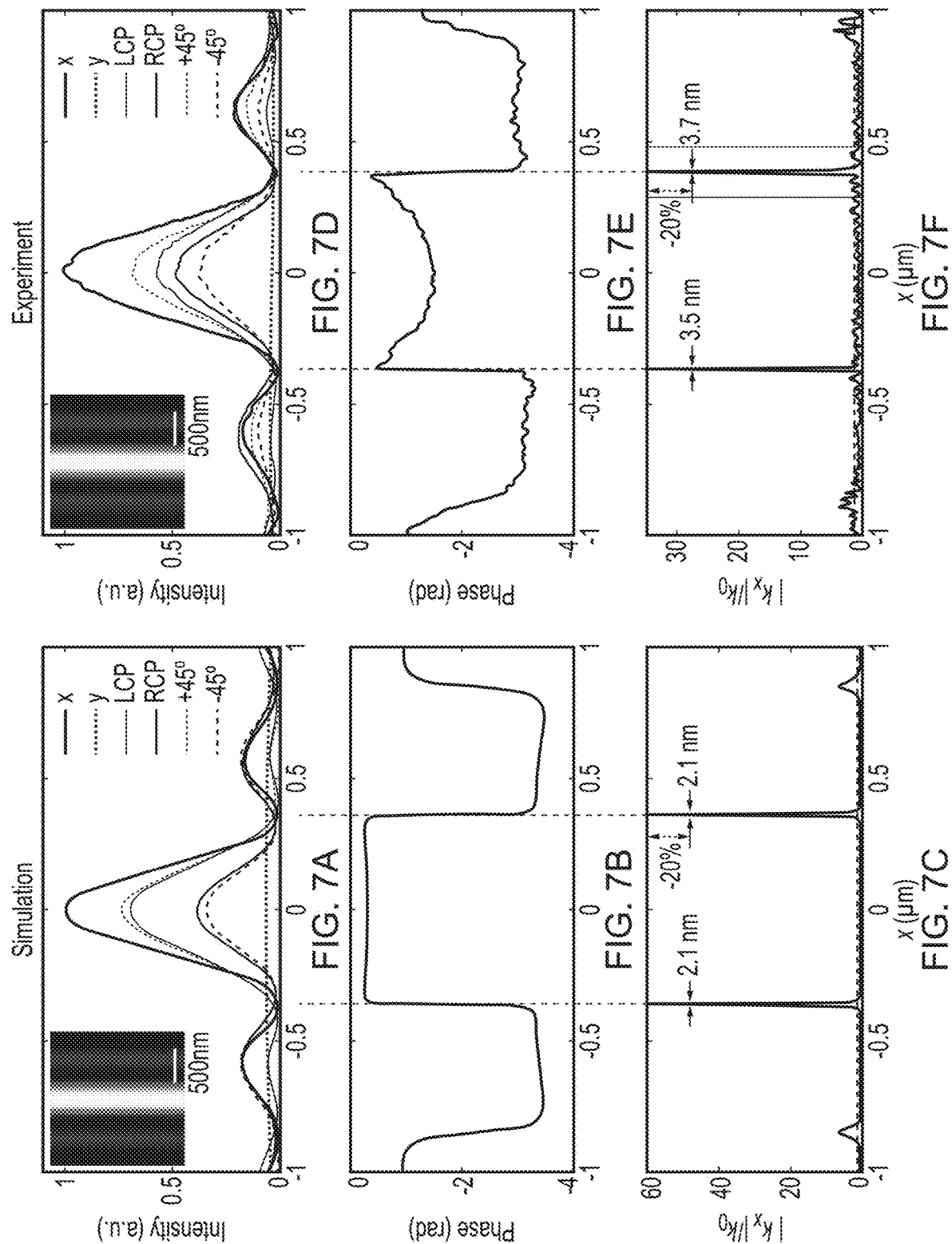

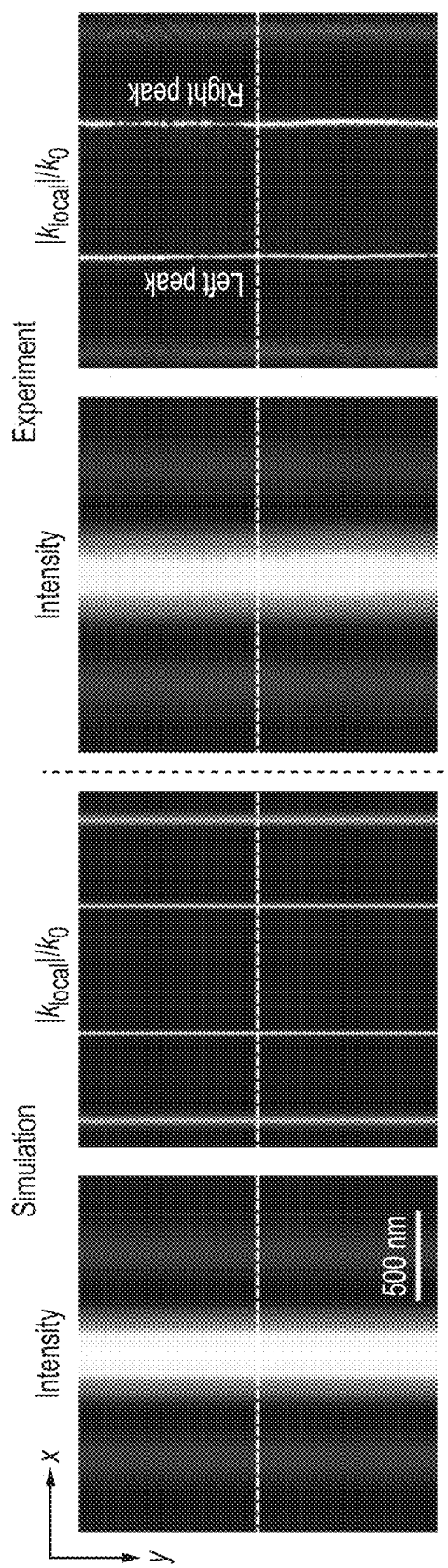
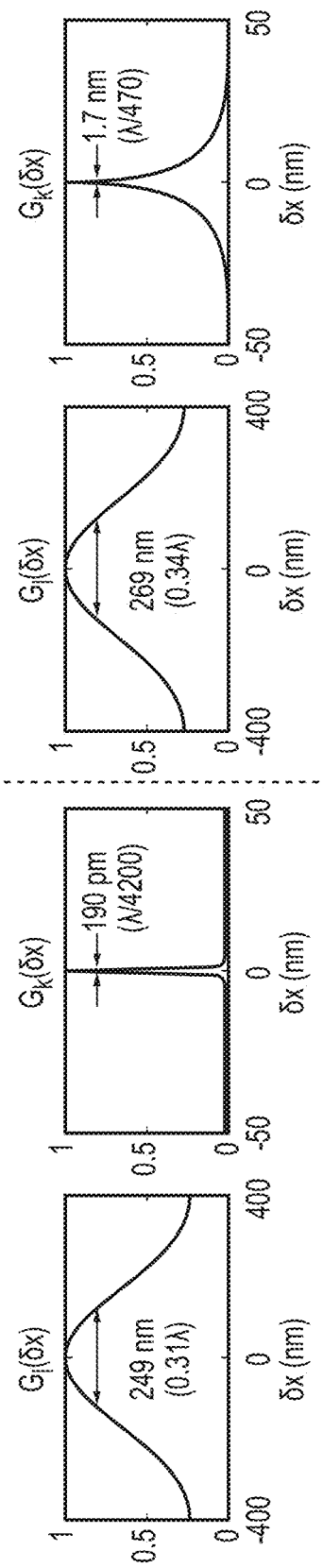

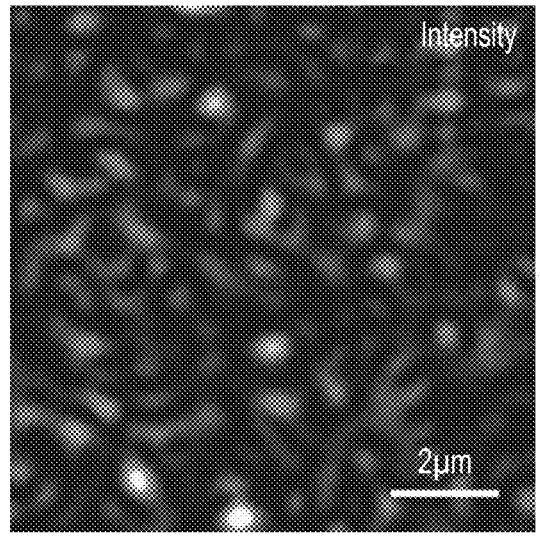
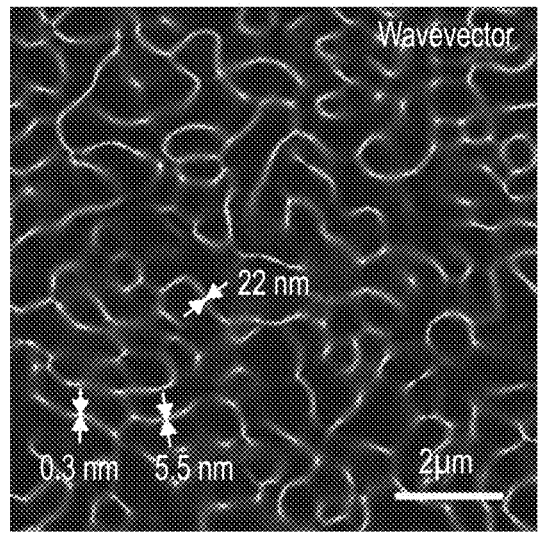
FIG. 14A
FIG. 14B
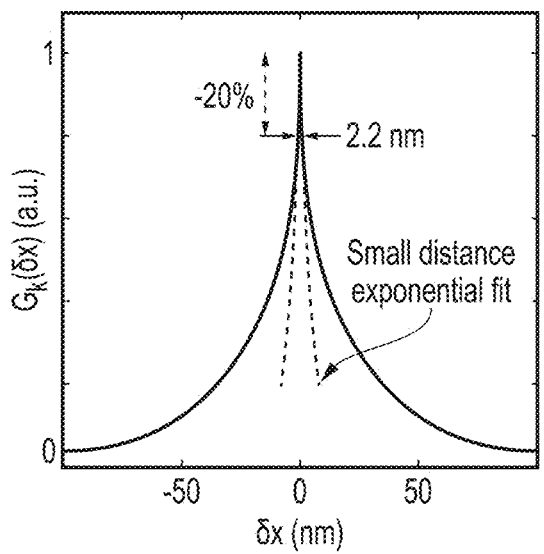
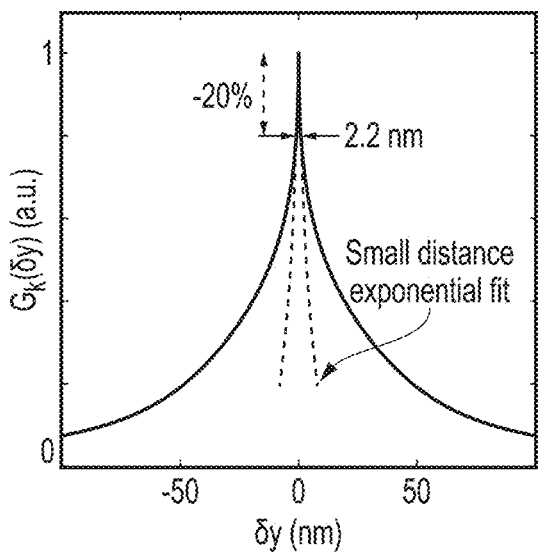
FIG. 14C
FIG. 14D

METHOD AND APPARATUS FOR SUPER-RESOLUTION OPTICAL METROLOGY

BACKGROUND OF THE INVENTION

The present invention relates to methods and apparatus for super-resolution optical metrology.

Conventional imaging techniques and techniques for light-based metrology (which is valuable owing to the ability to make non-contact measurements) have a spatial resolution limited to around half the wavelength of the light used to interrogate the object to be imaged or measured. This value arises from the diffraction limit, and the related Abbe-Rayleigh rule, which dictates that a conventional lens is unable to focus light propagating in free space to a spot smaller than half the wavelength. This is clearly highly limiting for basic metrology techniques in which an observation microscope is used to compare an object with a measurement scale (ruler), and also applies to more complex approaches such as the use of laser interferometers for displacement measurements. Interferometry, while offering high accuracy, also has drawbacks including the need for high stability and a dependence on bulk optical components that prevent miniaturization. While various techniques can improve the positioning and sharpness of the interference peaks, the resolution is still determined by the free space optical wavelength. Hence, imaging and metrology on the nanometre scale (nanoscale) is difficult.

Early attempts to overcome the Abbe-Rayleigh diffraction limit for imaging of microscale and nanoscale objects relied on recording the evanescent field of an object, in techniques such as contact photography and scanning near-field microscopy (SNOM). These near-field techniques have proven nanoscale resolution, but capturing evanescent fields requires a probe (or photosensitive material) to be in the immediate proximity of the object, so the techniques cannot be used to image inside cells or silicon chips. The requirement for a sensor very close to the object severely limits the application of these methods for nanoscale metrology in smart manufacturing, for example, in which measurement sensors work alongside and simultaneously with processing tools. More recently, other techniques have been proposed to reconstruct and capture evanescent fields including the far-field Veselago-Pendry "super-lens", which uses a slab of negative refractive index metamaterial as a lens to image evanescent waves from an object onto a camera. This approach, however, faces substantial technological challenges in its implementation in optics, and has not yet been developed as a practical imaging technique.

For biological applications, super-resolution imaging is dominated by the powerful methods of stimulated emission depletion (STED) and single-molecule localization (SML) microscopies. These are far-field techniques which have demonstrated the possibility of nanoscale imaging without capturing evanescent fields, which decay over a scale of about one wavelength away from the object and can therefore be problematic to detect. These approaches have become widely used, but also have limitations. Both STED and some of the SML techniques use an intense beam to excite, deplete or bleach fluorophores in a sample, but this can cause damage, known as phototoxicity, by stressing and eventually killing living samples. SML is also inherently slow, requiring thousands of images to be captured to build a single high-resolution image. Moreover, STED and SML require fluorescent reporters within the sample. This is usually achieved by genetic modification or antibody-mediated labelling with fluorescent dyes or quantum dots, but the labels are known to change the behaviour of the molecules or biological systems being studied. Furthermore, they cannot be applied to solid artificial nanostructures, such as silicon chips.

Accordingly, super-resolution techniques for imaging and metrology that are more universally applicable and less complex to implement are of significant interest.

SUMMARY OF THE INVENTION

Aspects and embodiments are set out in the appended claims.

According to a first aspect of certain embodiments described herein, there is provided a method of determining a displacement, comprising: generating an interferometric superoscillatory field from coherent electromagnetic radiation, the interferometric superoscillatory field comprising an interference pattern between a reference field and a superoscillatory field; detecting with a detector a first set of intensity distributions of the interferometric superoscillatory field, each intensity distribution from a different polarisation state of the electromagnetic radiation; detecting with the detector a second set of intensity distributions of the interferometric superoscillatory field, each intensity distribution from the same polarisation states of the electromagnetic radiation as the first set of intensity distributions; extracting a first local wavevector distribution from the first set of intensity distributions and a second local wavevector distribution from the second set of intensity distributions; comparing the first local wavevector distribution and the second local wavevector distribution to identify any change in position of one or more features in the local wavevector distributions; and ascertaining that a lateral displacement has occurred between the interferometric superoscillatory field and the detector if a change in position is identified.

According to a second aspect of certain embodiments described herein, there is provided an apparatus configured to implement a method according to the first aspect.

According to a third aspect of certain embodiments described herein, there is provided an apparatus for determining a displacement comprising: a first part comprising a superoscillatory field generator configured to generate an interferometric superoscillatory field from coherent electromagnetic radiation with any of multiple polarisation states, the interferometric superoscillatory field comprising an interference pattern between a reference field and a superoscillatory field; a second part comprising a detector configured to detect an intensity distribution of the interferometric superoscillatory field, the second part able to be laterally displaced from the first part; and a processor configured to: receive intensity distributions detected by the detector comprising a first set of intensity distributions each from a different polarisation state of the electromagnetic radiation and a second set of intensity distributions from the same polarisation states of the electromagnetic radiation as the first set of intensity distributions; extract a first local wavevector distribution from the first set of intensity distributions and a second local wavevector distribution from the second set of intensity distributions; compare the first local wavevector distribution and the second local wavevector distribution to identify any change in position of one or more features in the local wavevector distributions; and ascertain that a lateral displacement has occurred between the first part and the second part if a change in position is identified.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, methods and apparatus may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which:

FIGS. 13C and 13E show computer simulations of an interferometric superoscillatory field intensity profile and its local wavevector profile for the same conditions as the data of FIGS. 13A and 13B; FIGS. 13G and 13I show the experimentally measured and determined intensity profile and local wavevector profile for the interferometric superoscillatory field used to obtain the data in FIGS. 13A and 13B; and FIGS. 13D, 13F, 13H and 13J show plots of the autocorrelation functions of the profiles in FIGS. 13C, 13E, 13G and 13I;

FIG. 14A shows an image of an intensity profile of a two-dimensional interferometric superoscillatory field; FIG. 14B shows an image of the local wavevector profile of the interferometric superoscillatory field, and FIGS. 14C and 14D shows cross-sections in the x-direction and the y-direction of the autocorrelation function of the local wavevector profile.

DETAILED DESCRIPTION

Figure 1:
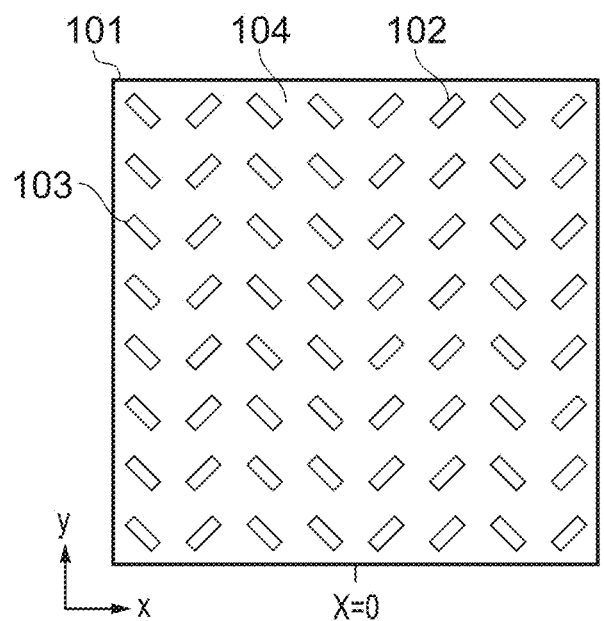
FIG. 1 shows a schematic plan view of a first example metasurface suitable for generating a superoscillatory field.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The field of plasmonics relates to coupled electromagnetic states of light and free electrons in metals. Light can be evanescently confined near the surface of nanoparticles and other objects structured with features on the nanoscale, giving a field with a detailed spatial spectrum which can change very rapidly and include high spatial frequencies. While these characteristics enable some high resolution imaging techniques, it is necessary to detect the optical field very close to the object, which necessarily restricts use of these techniques. The evanescent component of the field decays rapidly with distance from the nanostructure (within a few free-space wavelengths of the optical radiation), and does not propagate into free space. The term "nanoscale" indicates objects or features with dimensions below about 1 µm, in other words, 1000 nm or smaller.

However, it has been found that similarly detailed spatial spectra can be produced in the far field, remote from a nanostructured medium, using diffraction of optical plane waves. Under certain bandwidth-limited conditions, the spatial spectrum or distribution of an optical field can locally oscillate much faster than the highest Fourier component, and the local Fourier transform can have both positive and negative values. This is known as superoscillation, which is applicable generally to wave functions, and is not limited to light. In the context of optics, a combination of several plane waves, for instance resulting from diffraction of a single plane wave on a nanostructure, can generate, in free space far from the nanostructure, a so-called superoscillatory field which contains highly localised zones of light (hot spots) with dimensions beyond the Abbe-Rayleigh diffraction limit and/or minute regions of rapidly changing phase and corresponding very high values of the local wavevector (phase gradient).

The present invention recognises that these features can be utilised for applications including metrology and imaging.

Herein, the terms such as "superoscillatory field", "superoscillatory optical field" and "superoscillatory wave" are used to refer an optical field (illuminated region) with the above-noted features, i.e. one or more localised zones of increased or high light intensity, also known as hot-spots, and/or one or more localised regions of rapid phase change, also known as phase singularities, where these zones and regions are sized below or substantially below or significantly below the diffraction limit of half the free-space wavelength, $\lambda/2$, of light used to generate the field. The field contains features of intensity and/or features of phase and/or features of wavevector which exist and/or change over spatial dimensions on this sub-wavelength scale. As will be described further below, the field may be a direct or non-interferometric superoscillatory field, or an interferometric superoscillatory field created by the combination of a direct superoscillatory field and a plane wave. Unless specified or clear from the context, the above-noted terms can refer to either of these alternatives.

For some applications, the intensity of a superoscillatory optical field is useful, and this can be detected directly from the field with suitable optical equipment. For other purposes, and in particular for the metrology described herein, the phase is of interest. In order to access the phase of a superoscillatory optical field, it is possible to utilise an interferometric arrangement. Interferometry requires two waves to interact and the resulting combination of the two waves is an interference pattern, in which each point is the sum of the complex amplitudes of the two waves at that location, which may add or cancel. Typically, one wave is a wave under investigation, carrying information of interest (in the present case, the superoscillatory field), and the other is a reference wave (typically a plane wave). Phase information can be extracted from an intensity measurement of the interference pattern, which may be referred to herein for convenience as an interferometric superoscillatory field, a superoscillatory interferometric pattern or a superoscillatory interference pattern. Hence, the terms "interferometric superoscillatory field", "superscillatory interferometric pattern" and "superoscillatory interference pattern" are used herein to indicate an interference pattern (interference field, interference wave) generated from a superoscillatory field (superoscillatory wave) and a reference field (reference wave or plane wave).

Superoscillatory fields can be generated by passing an optical plane wave through a nanostructured or metamaterial mask, also referred to as a metasurface, which is a mask patterned on the nanoscale with features of a subwavelength size. An intensity mask or intensity metasurface comprises a thin opaque film of a material such as metal or semiconductor with a pattern of precisely sized and oriented nanoscale apertures that transmit and modify the incident plane wave to generate a superoscillatory field. A phase mask or phase metasurface comprises a thin film of a transparent material patterned with bumps or protrusions (regions of variable thickness). Light passing through the mask experiences different phase retardation according to the thickness of the material, again resulting in a superoscillatory field. A combined metasurface or mask is configured to control the transmission of incident light in both intensity and phase.

If an interferometric superoscillatory field is needed, the two waves required for interference can be created using certain formats of intensity metasurface. Such an example is an intensity metasurface in the form of a planar mask or metasurface, fabricated in a thin opaque film by a nanofabrication technique such as focused ion beam milling or electron beam lithography. The metasurface is patterned with a plurality of identically sized and shaped slits dimensioned on a sub-wavelength scale, to cause scattering and diffraction of incident light. The slits may be arranged in a regular array of rows and columns, equally spaced from one another. For the purposes of description, the metasurface can be considered to occupy an x-y plane, with the rows of slits aligned along the x-direction (x-axis) and the columns of slits aligned along the y-direction (y-axis). Each slit is oriented at either +45° or −45° with respect to the x-axis. Note, however, that other arrangements of slits are possible, such as random or concentric; the pattern can be selected to control the structure of the superoscillatory field.

In a first example, configured to generate a superoscillatory field patterned in one dimension only within a plane parallel to the plane of the metasurface, the pattern of slits has translational symmetry in the y-direction. In other words, within a column every slit has the same orientation. Along a row, in the x-direction, the orientation of the slits is varied so as to achieve multiple diffraction of the incident light in order to create a superoscillatory field in free space on the transmission side of the mask, the field containing phase singularities and/or zones of strong light localisation. Such arrangements of slits allow the metasurface to work similarly to a cylindrical lens which focuses light into a line. Such a metasurface can be considered to operate in one dimension as regards generation of the superoscillatory field at a propagation distance z from the plane of the metasurface.

FIG. 1 shows a plan view of an example intensity metasurface in which slits with the same spacing either side of x=0 have opposite orientations. The metasurface 101 comprises an array of slits formed in a thin film 104, some slits 102 oriented at +45° and some slits 103 oriented at −45°. The array of slits hence has mirror symmetry about the x=0 line. This is merely an example of slit orientation, however.

The slit dimensions and the film thickness can be optimised for the intended wavelength of the incident optical plane wave. The period of the slit spacing or separation (spacing of adjacent slits) is preferably less than the intended wavelength so that only the zeroth diffraction order is generated for light propagating through the metasurface with the same polarisation state of the incident wave. Light propagating with the orthogonal polarisation generates the superoscillatory field; this is described further below. Hence, this arrangement enables generation of a reference plane wave for the desired interference, together with the superoscillatory field. Also, the described arrangement of slits creates a metasurface or mask which is polarisation-sensitive, in that the characteristics and features of the field on the transmission or output side of the mask depend on the polarisation state of the plane wave incident on the input side of the mask. As an example only, a mask may measure 40 μm by 40 μm, and comprise 100 rows and 100 columns of slits. Typical slit dimensions are 400 nm long and 50 nm wide. As an example, the metasurface may be a Pancharatnam-Berry phase metasurface [1, 2].

Figure 2:
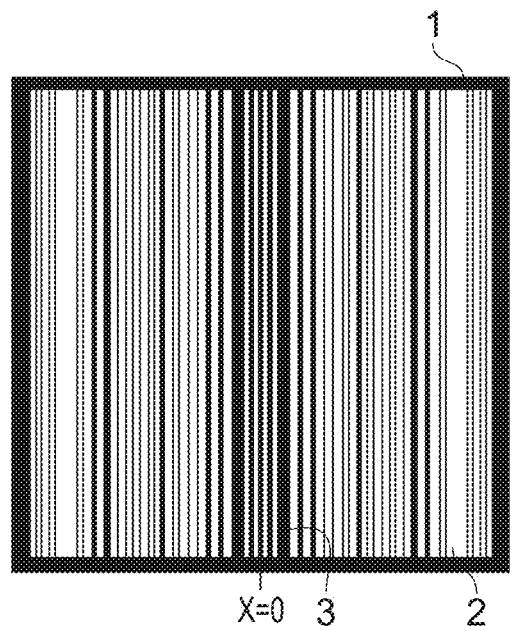
FIG. 2 shows a schematic plan view of a second example metasurface suitable for generating a superoscillatory field.

FIG. 2 shows an example of a different format of metasurface suitable for generation of a superoscillatory field. It comprises an opaque film 1 patterned with a complex aperiodic grating comprising nanoscale vertical transmissive stripes. The transmissive (white) portions 2 can be considered to have unitary transmission at the incident wavelength (i.e. no attenuation of the light) and the opaque (black) portions 3 can be considered to have zero transmission. Accordingly, the mask is an intensity mask. The stripes are configured to have various thicknesses and separations, but are, in this example, reflected either side of the central, x=0, line. As an example only, a mask of this type may measure 64 μm by 64 μm. This arrangement gives some similarity with the FIG. 1 mask, in that the metasurface behaves similarly to a cylindrical lens by generating a superoscillatory field that has intensity variation in one direction only. However, unlike the FIG. 1 mask patterned with a grid of angled slits, it does not generate a plane wave in addition to the superoscillatory field, so cannot be used for applications requiring an interferometric superoscillatory field. However, a mask of this type is suitable when only intensity measurements are required, with no need for phase information.

Accordingly, a range of masks or metasurfaces are available for the generation of superoscillatory fields, with and without the capability to generate an interferometric field. Masks able to produce an interferometric field can be termed interferometric masks. Further information regarding metasurface design and fabrication can be found in [3, 4, 5, 6, 7].

Returning to an interferometric mask of the FIG. 1 type, patterned with slits, in use, the mask, which we can consider to be arranged in the x-y plane, is illuminated from one side (input side) with an incident plane wave propagating in the z-direction, with a known polarisation. The orientation of the slits affects the outcome of light propagating through the mask to arrive at the output or transmission side, depending on the incident polarisation orientation. For example, if the incident light is polarised along the x-axis, the light transmitted by the slits, which are oriented at +45° and −45° to the x-axis, will have a π phase difference in the y-polarisation direction. This transmitted light forms the desired superoscillatory field, which is in cross-polarisation to the incident field. Hence, in this example and orientation, the pattern of slits works as a binary phase mask for y-polarisation. The part of the transmitted field which is co-polarised with the incident wave, in this case the x-polarisation, has propagated through the mask as a plane wave, with some attenuation. Indeed, when the metasurface is illuminated with x-polarised light, the phase of x-polarised transmitted light is independent of the slit orientation, and the x-polarised light remains as a plane wave because the period of the slits is sub-wavelength and only the zeroth diffraction order is generated. Similarly, if the mask is illuminated with y-polarised light, the superoscillatory field pattern is created in the x-polarisation while light passing through the metasurface as a plane wave has y-polarisation; now the slits are operating as a binary phase grating for x-polarisation. Hence the mask is polarisation-sensitive, and only creates a superoscillatory field in cross-polarisation with the incident wave. At the same time, however, part of the transmitted light forms a plane wave (in co-polarisation with the incident wave). This provides the two waves required for interferometry: the superoscillatory field, and the plane wave which can be used as a reference wave.

Figure 3:
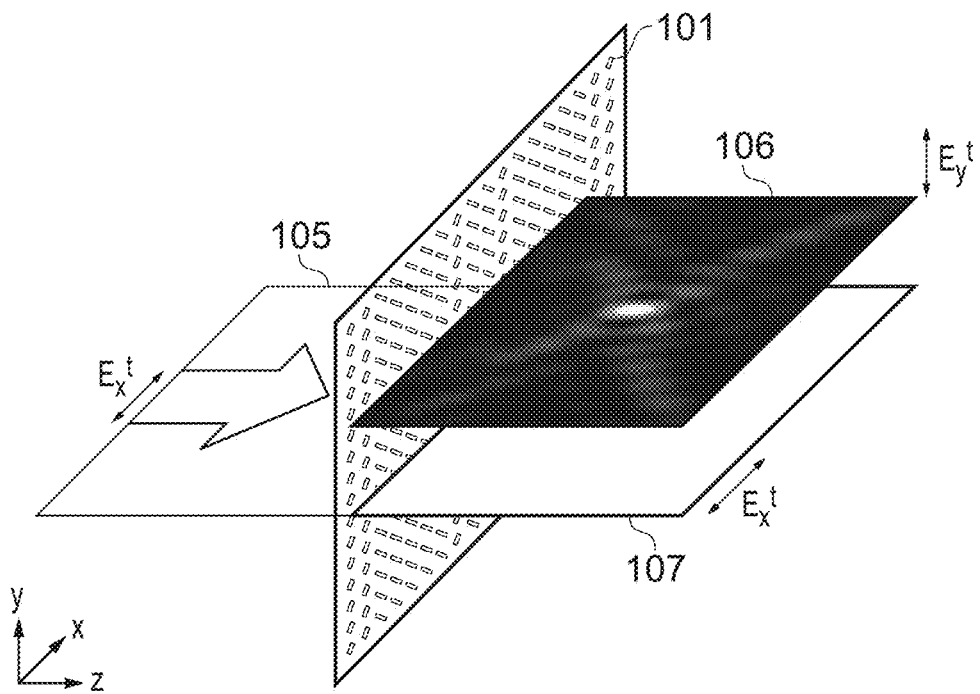
FIG. 3 shows a schematic perspective representation of reference wave or field and a superoscillatory field generated by transmission of a plane wave through a metasurface, presented as a cross-section perpendicular to the metasurface.

FIG. 3 shows a highly schematic representation of the result of illuminating a mask patterned according to the FIG. 1 example. Incident light 105 propagating along the z-direction and polarised in the x-direction, such that its transverse electric field is $E^i_x$, passes through the mask 101 to create a superoscillatory field 106 with a y-polarisation, and a plane wave field 107 with a x-polarisation. This can act as a reference field to interfere with the superoscillatory field 106.

While FIG. 3 shows the two transmitted fields 106, 107 as displaced from one another, this is for ease of illustration only. In reality the superoscillatory field 106 and the reference field 107 are coincident (overlapping) in space, and hence interfere with each other. Hence, the metasurface 101 itself inherently by its transmission operation generates the two fields or waves needed for the desired interferometry. Additionally, the two fields are created in a particularly attractive way, since the wavefronts are mutually stable and physically aligned, having been derived from the same original wavefront by transmission through the same metasurface. Hence, alignment problems typical of conventional interferometry arrangements are moot.

Upon transmission through the metasurface, the x-polarised field 107 (continuing with the same example orientation) suffers the same phase retardation regardless of the orientation of the slits and with the same intensity attenuation at all points due to the energy transfer into the cross-polarised field. Therefore, for the x-polarised field 107 the metasurface has acted as a homogeneous sub-wavelength grating of limited size (aperture), producing only a zero-order diffraction field in the form of a plane wave. In reality, the x-polarised light 107 does show some variation from a plane wave due to aperture diffraction at the edges of the metasurface. Nevertheless, it is a good reference field for interferometry as it has a phase close to that of a plane wave and a well-defined, easy to measure intensity profile with no zeros.

The optical field available for observation and detection is therefore the interferometric output of the metasurface, generated as an inherent feature of its operation, and comprising the interference (interference pattern or interferometric wavefront) of the superoscillatory field (the pure diffracted superoscillatory wavefront) with the reference field. The interferometric superoscillatory field can be observed and recorded by measuring the intensity distribution in the x-y plane or along the x-direction (or in some cases the y-direction) for different distances from the output side or face of the metasurface, in other words different values of z. The x-y plane can be considered to be a transverse plane, occupying transverse dimensions or directions in that the dimensions are transverse (orthogonal, perpendicular) to the optical propagation direction of the light forming the superoscillatory field. The metasurface is considered herein to be located at z=0. For example, to obtain a map of the superoscillatory field in the x-z plane, so as to allow a study of the change in features with propagation distance, the intensity distribution can be measured along the x-direction for multiple z positions. The results are combined to produce an intensity map in the x-z plane (also referred to as a distribution or a profile).

Figure 4:
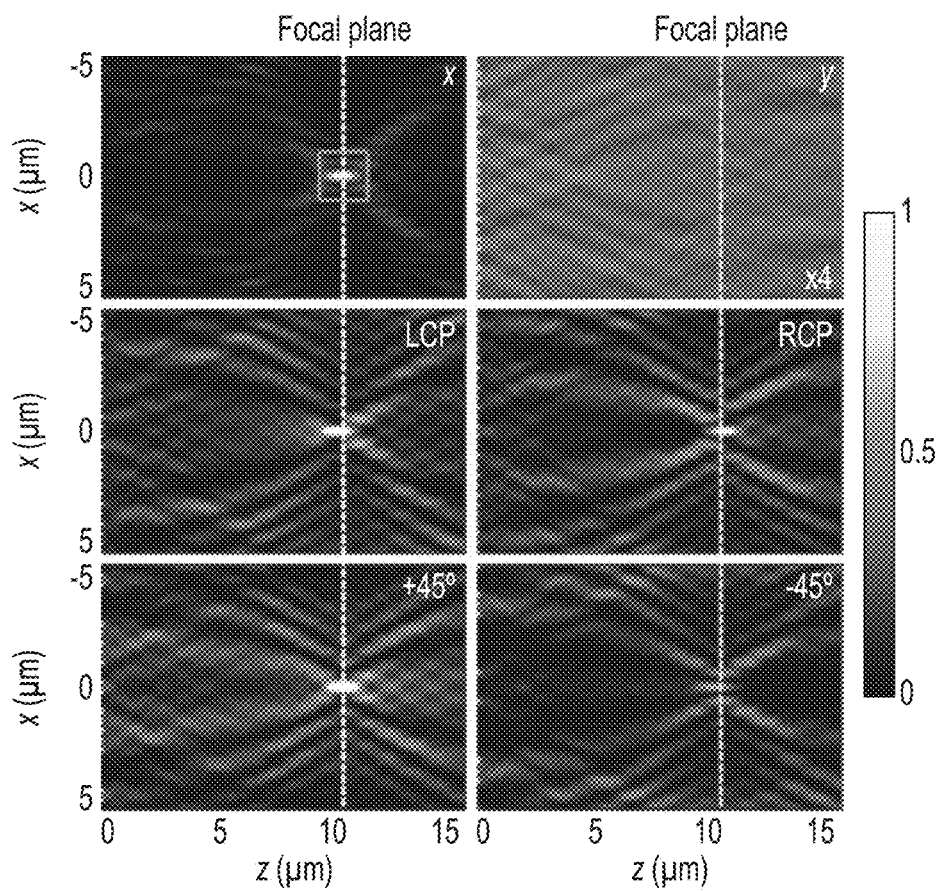
FIG. 4 shows a set of computer-generated intensity distributions of interferometric superoscillatory fields produced from different incident plane wave polarisations, presented as a cross-section perpendicular to the metasurface.

FIG. 4 shows computer simulated results (obtained using a finite difference time domain (FDTD) calculation) of such an x-z plane map or cross-section of intensity measurements of the y-polarised component of the interferometric wavefront (also referred to as a diffraction pattern) generated for different incident polarisation states. The different states comprise x-polarisation, y-polarisation, left circular polarisation (LCP), right circular polarisation (RCP), +45° linear polarisation and −45° linear polarisation. The polarisation states are indicated in the top right corner of each intensity map, together with the dimensions in the x and z directions. The incident light had a wavelength λ of 800 nm. Polarisation states oriented at ±45° are applicable to the example metasurfaces with slits having this orientation; for other slit configurations, pairs of orthogonal linear polarisations at different orientations will be appropriate.

It can be seen from FIG. 4 that when the incident light is x-polarised, the y-polarised component of the diffracted wave contains a superoscillatory hotspot (similar to a focus) at a distance of 10 µm from the metasurface. This is marked by a box in FIG. 4. The hotspot or focal spot or point has a full width at half maximum (FWHM) of 0.42λ, which is well below the Abbe-Rayleigh diffraction limit given by λ/2NA=0.56λ for a cylindrical lens with a numerical aperture corresponding to the experimental situation of NA=0.89 (20 µm size lens with a focal distance of 10 µm). This small feature size indicates the usefulness of superoscillatory fields for improving the resolution of optical metrology and imaging.

Under y-polarised illumination, the y-component of the diffracted wave is the reference field used for the interferometry. For an infinitely long metasurface (diffraction grating), it would show no structural features, while the minor variations in the transmission amplitude seen in FIG. 4 are due to the aperture effects of the finite metasurface. With a circularly polarised incident wave (LCP and RCP), the y-component of the diffraction patterns originates from the interference of the superoscillatory field and the reference wave with an initial phase difference of $\pm\pi/2$ between them, depending on the handedness of the incident polarisation. Similarly, for the incident linear polarisation at ±45°, the y-component has a phase difference between the superoscillatory and reference fields of 0 and π respectively. For elliptically polarised illumination, multi-step phase differences other than $\pm\pi/2$ can be introduced as well.

These simulated results have been replicated experimentally, using an 800 nm wavelength diode laser as an optical source, and mapping the intensity of the interference pattern with a CMOS camera placed on a nanometric translation stage and equipped with a ×500 magnification optical system.

Figure 5:
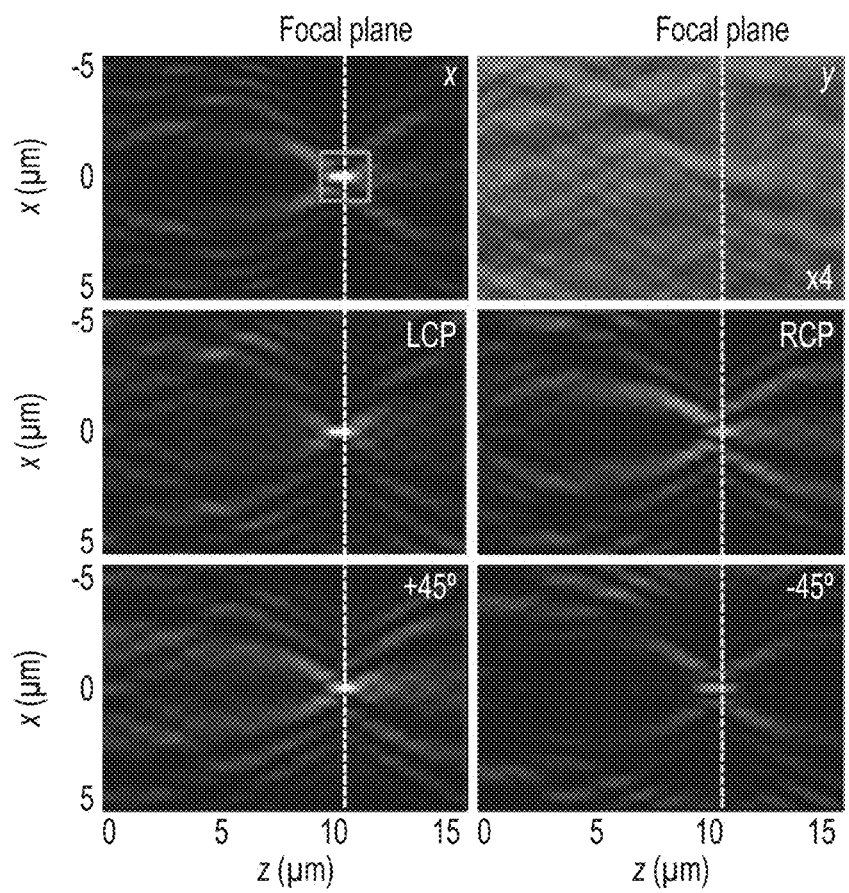
FIG. 5 shows a set of detected intensity distributions of interferometric superoscillatory fields generated experimentally under the same conditions as the computer generation used to produce the FIG. 4 intensity distributions.

FIG. 5 shows the experimental results, indicating good correspondence with the computer simulated results of FIG. 4. In particular, the superoscillatory hotspot is observed at z=10 µm, and its FWHM is measured to be 0.43λ, roughly only a 2% difference from the computed size of the hotspot. Hence, the actual superoscillatory field includes spatial features sized below the Abbe-Rayleigh diffraction limit, and spaced apart from the surface of the mask, in the far field. These features indicate the applicability of superoscillatory fields for super-resolution techniques.

Also, note use of the CMOS camera and ×500 magnification in obtaining the experimental results. The resolution of such a detector depends on its pixel size and will be, of itself, insufficient for direct mapping and exploration of the spatial features of the superoscillatory field. However, the superoscillatory field is formed by interference of optical waves propagating in free space. This means that it can be imaged by magnification with a conventional lens or lenses (or equivalently, one or more mirrors) without loss of resolution of the spatial features, in order to enlarge the field for detection by a conventional imaging or optical detection apparatus, such as the aforementioned CMOS camera, if the numerical aperture of the imaging lens is sufficiently larger than that of the metasurface mask. This is a further benefit of the proposed use of superoscillatory fields for far field imaging and metrology.

Indeed, the ability to image the free-space superoscillatory field at any magnification level and without any loss of resolution is a significant feature for the super-resolution techniques disclosed herein. It gives straightforward access for the purpose of light detection to the extremely small scale features of these fields, allowing them to be utilised in a range of applications. This attractive characteristic is applicable to both interferometric and non-interferometric superoscillatory fields.

A number of distinguishing characteristics of a superoscillatory field can be utilised for imaging and/or metrology, and these will now be explained in more detail.

Figures 6A, 6B, 6C:
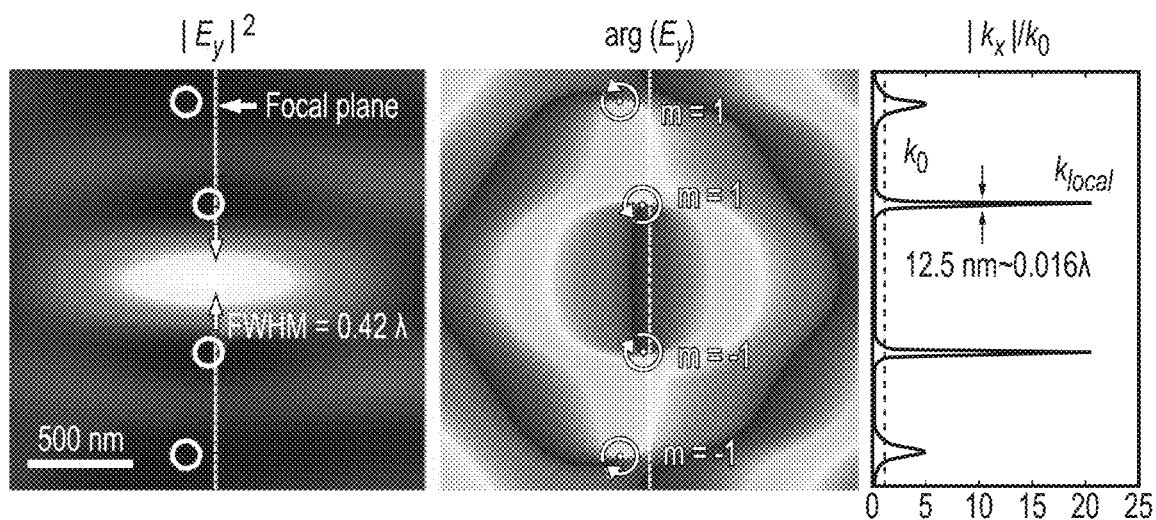
FIG. 6a shows a magnified portion of a computer-generated intensity distribution from FIG. 4 presented as a cross-section of the field perpendicular to the metasurface.
FIG. 6b shows a corresponding phase distribution of the superoscillatory field.
FIG. 6c shows a plot of the local wave vector across the phase distribution of FIG. 6b.

FIG. 6a shows an enlargement of part of FIG. 4, being the part marked by a box in the top left intensity map, with the "focal plane" (plane occupied by the hotspot) at 10 µm distance from the metasurface marked as a dotted line. From this it can be appreciated that the superoscillatory hotspot or focus has a size along the x-direction which is smaller than that predicted by the Abbe-Rayleigh diffraction limit, because this limit does not take account of superoscillation. The focus is surrounded by fringes, similar to how the focal spot of a conventional lens of finite size is surrounded by the oscillating Airy pattern. However, here the fringes are more densely spaced than those in an Airy pattern, and more extensive fringes are present. Indeed, it is known that superoscillatory hotspots are always surrounded by intense halos or fringes. At the focal plane, the intensity of the first side lobe is 17.6% of the peak intensity of the central hotspot. For the experimental results shown in FIG. 5, the corresponding figure is 16%. Hence, a superoscillatory field contains many small-scale rapidly changing spatial intensity features that may be utilised for imaging or metrology.

The phase of the superoscillatory field is also of significant interest, and can be extracted or retrieved from the intensity of the interferometric pattern. If intensity distributions or maps, designated as I, are measured that are generated from illumination of the metasurface with each of LCP, RCP and ±45° linear polarised light (or appropriately oriented linear polarisation according to the slit orientation in the metasurface), it is possible to retrieve the phase φ of the superoscillatory field. The phase distribution φ of the y-polarised component $E_y$ of the field is φ=arg($E_y$), and this can be retrieved from the intensity distribution of this component, $I_y$, of the interference pattern at a distance z from the mask using the following equation:

$$\varphi = \operatorname{atan}\left(\frac{I_y^{LCP} - I_y^{RCP}}{I_y^{+45°} - I_y^{-45°}}\right) + k_0 z \quad (1)$$

in which $I_y$ is the y-polarised component of the intensity distribution for each polarisation state as indicated by the superscripts, and $k_0$ is the free-space wavevector for the wavelength λ of the illuminating light. In the present example, the relevant distributions of intensity and phase are in the x-z plane, so comprise $I_y(x,z)$ and φ(x,z), but in other cases may be in the x-y plane so comprise and $I_y(x,y)$ and φ(x,y), or may be linear distributions only, such as along the x-direction so as to comprise $I_y(x)$ and φ(x).

FIG. 6b shows a phase map in the x-z plane retrieved from the intensity map in FIG. 6a. From this, it can be appreciated that superoscillatory fields contain phase singularities; these are indicated in FIG. 6a and FIG. 6b by the circular arrows. At the low intensity regions near the hotspot, on either side of the fringes, four phase singularities can be observed. When moving around a loop encircling a phase singularity (such as the circular arrows), the phase changes by $2\pi$. The two singularities in the upper part of the phase map have a topological charge of m=+1, while in those in the lower part have a topological charge of m=−1. They are present on a minute scale.

The presence of these phase singularities produces a third important feature of superoscillatory fields. The local transverse wavevector, $k_x$ (if we consider the x direction), at positions along the x direction corresponding to the singularities, has large or gigantic values far exceeding the free-space wavevector $k_0=\omega/c$, where $\omega$ is the frequency of the light and c is the speed of light. The local wavevector is determined from the phase, according to $k_x$=curl$_x\varphi$. Since the underlying phase singularities occupy a minute space, the corresponding local wavevector peaks are also very small in width, and well below the diffraction limit.

FIG. 6c shows a plot of the normalised transverse local wavevector, $|k_x|/k_0$, at z=10 μm. From this it can be seen that $|k_x|$ has a pattern of large and very narrow peaks corresponding to the positions of the phase singularities, and at or near the phase singularities has values more than an order of magnitude higher than $k_0$ (the value of which is indicated by FIG. 6c by the dotted line). As indicated on the plot, the FWHM of the larger peaks, corresponding to the singularities closest to the hotspot, is 12.5 nm, which is approximately 0.016λ for the 800 nm wavelength. In other words, the superoscillatory field offers spatial features in free space on the scale of about λ/100, or one hundredth of a wavelength. This is highly significant as a means for improving the resolution of imaging and metrology very greatly compared to the restrictions imposed by the Abbe-Rayleigh diffraction limit.

Experimental results have been obtained that correspond well with the simulation of FIGS. 6a, b and c. In particular, very large values of the local k vector have been determined experimentally, in line with FIG. 6c.

The presence of such small-scale, sub-diffraction limit, features in both the intensity and phase domain (the superoscillatory hotspot and the phase singularities) offers greatly enhanced resolution for imaging and metrology techniques. More details regarding the generation of superoscillatory fields and the spatial details which they contain and which may be extracted from them can be found in [8].

Since the FIG. 1 intensity metasurface discussed thus far has a translational symmetry in the y-direction, the intensity distribution of the superoscillatory field in the x-y plane, that is, in a plane parallel to the metasurface, is substantially non-variant in the y-direction (the metasurface acts similarly to a cylindrical lens with its curvature in the x-direction). In other words, the field comprises a series of stripes of varying intensity. At the focal plane the field comprises a central bright line corresponding to the hotspot, and less intense side bands corresponding to the fringes adjacent to the hotspot. It is hence also meaningful to consider the intensity, phase and k vector distributions in one dimension only, along a line parallel to the x axis and lying in the focal plane.

FIG. 7 shows simulated and experimental results of such an analysis, using the same metasurface as previously discussed, and a wavelength of 800 nm. Experimentally, an improved detection arrangement was used; the intensity was detected using a ×1300 magnification optical system with NA=0.95 to project the diffraction field onto a CMOS sensor with a pixel size of 6.5 μm, which gave an effective pixel resolution of 5 nm in the observation plane. FIG. 7A shows the intensity distribution of the y-component along the x-direction in the focal plane for the various incident polarisations: linear x and linear y, LCP and RCP and linear ±45°. The y-polarisation result corresponds to the substantially constant reference field, so shows no peaks and zeros, while the other five results show a central peak at the hotspot location and side peaks corresponding to the fringes discussed with regard to FIG. 6a. Inset in FIG. 7A is an image of the intensity distribution in the x-y focal plane, showing the stripes mentioned above.

FIG. 7B shows the phase distribution along the x-direction, retrieved from the intensity distributions at the different polarisations of FIG. 7A, calculated in accordance with equation (1). There are very rapid phase changes corresponding to the regions of lowest intensity, which arise from phase singularities such as those shown in FIG. 6b.

FIG. 7C shows the distribution of the normalised local wave vector along the x-direction, determined from the phase distribution of FIG. 7B. As expected, it shows large and narrow peaks arising from the rapid phase changes. The larger peaks have a width of 2.1 nm at 80% height.

In line with the data of FIGS. 6a and 6b, it is again apparent that within a superoscillatory field, there are areas of rapid variations of phase and corresponding peaks in the local wavevector which are much narrower than the hotspot itself, which is nonetheless also narrow enough to be of interest for super-resolution applications.

FIGS. 7D, E and F show experimental results corresponding to the computer simulations shown in FIGS. 7A, B and C. The experiment can be seen to match the theory well, with the large local k vector peaks having widths of 3.5 nm and 3.7 nm, corresponding to about 0.004λ. This indicates the possibility of even higher resolution than the 12.5 nm wide local k vector peaks shown in FIG. 6c. Hence, very narrow spatial features with extremely sub-wavelength dimensions are available for metrology and imaging.

Figure 7G:
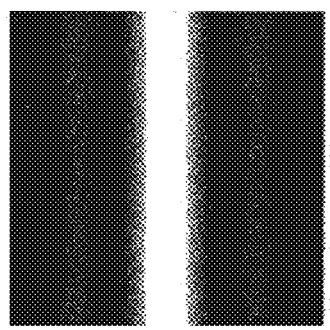
FIGS. 7G and H show respectively a computer-simulated intensity distribution of an interferometric superoscillatory field as a cross-section of the field parallel to the metasurface and similar to the field depicted in FIGS. 7A-F, and the corresponding distribution of the local wave vector in the same plane.
Figure 7H:
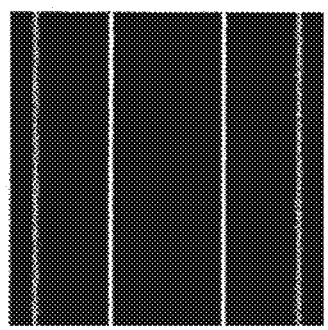
FIG. 7A shows a plot of one-dimensional intensity distributions for a computer-generated superoscillatory field generated from different incident plane wave polarisations presented as a cross-section of the field parallel to the metasurface.
FIG. 7B shows a plot of the corresponding phase.
FIG. 7C shows a plot of the corresponding local wave vector.
FIGS. 7D, E and F show experimental data produced using the same parameters as the computer generation of FIGS. 7A, B and C.

FIG. 7G shows a further example of an intensity distribution in the x-y plane, similar to the inset in FIG. 7A, while FIG. 7H shows a computer simulated image, also in the x-y plane, of the corresponding local wave vector. The striped pattern arising from homogeneity of the metasurface in the y direction is evident in both images, while the enhanced narrowness of the wavevector features compared to the intensity features can be readily appreciated.

Figure 8:
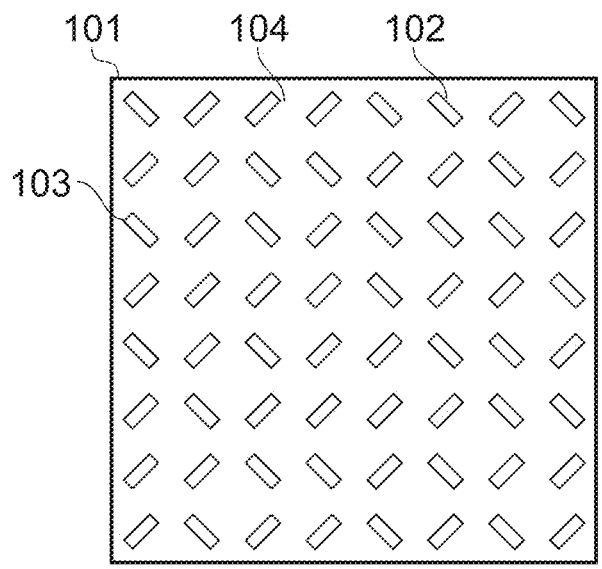
FIG. 8 shows a schematic plan view of a third example metasurface suitable for generating a two-dimensional random interferometric superoscillatory field.

FIG. 8 shows a plan view of an example metasurface 101 formed in a planar plasmonic film 104 and patterned with an entirely random distribtion of slits, some slits 102 oriented at +45° and some slits 103 oriented at −45°.

Figure 9A:
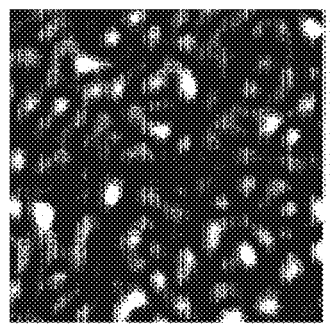
FIG. 9A shows an intensity distribution of a random interferometric superoscillatory field generated from a metasurface such as the FIG. 8 example.

FIG. 9A shows an intensity map in the x-y plane (parallel to the mask) generated by a randomly patterned mask such as the FIG. 8 example. The absence of any invariance in the slit pattern in either the x or y directions produces a superoscillatory field which varies randomly in both the x and y directions (two-dimensional superoscillatory field), in contrast to the striped pattern of the one-dimensional superoscillatory field produced by metasurfaces such as the FIGS. 1 and 2 examples. The intensity distribution comprises random speckle patterns including multiple discrete hotspots.

Figure 9B:
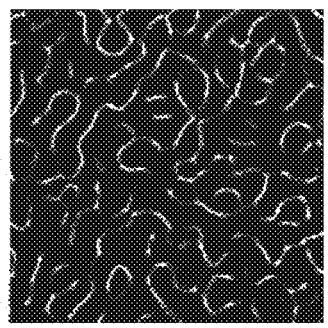
FIG. 9B shows the corresponding local wave vector distribution.

FIG. 9B shows the corresponding distribution of the local wavevector $k_x(x,y)$, calculated from a phase map $\varphi(x,y)$ retrieved from multiple two-dimensional intensity maps $I(x,y)$ at different incident polarisations as already explained. It can be seen that the wavevector features are significantly narrower than the intensity features, in line with the one-dimensional results already discussed. As before, the field contains phase singularities and therefore has features which change over distances that are orders of magnitude smaller than the wavelength of the light used to generate the superoscillatory field.

Both one-dimensional and two-dimensional intensity, phase and local wavevector maps may be utilised for metrology and imaging at super-resolution.

In summary, therefore, the diffraction of a coherent plane wave by a nanostructured mask (also metasurface, intensity metasurface or mask, phase metasurface or mask, metamaterial mask, nanostructured metasurface) generates a free-space (far-field) optical field by the interference of bandlimited waves (one superoscillatory and one substantially plane), which can have significantly sub-wavelength spatial features such as optical phase singularities and sub-diffraction hot-spots. Additionally, the superoscillatory field may be interferometric (the interference of a superoscillatory wave and a plane wave), if generated by a suitably configured mask. Moreover, and for all cases, the field can be magnified by conventional lens systems without loss of resolution, and projected to conventional optical detectors or cameras for detection of the intensity distribution of the field in real time.

According to the present disclosure, it is proposed to use fields of this type for metrology with greatly enhanced resolution, far below the diffraction limit of half a wavelength. To achieve this, the local wave vector distribution, comprising a highly structured optical field pattern or distribution with features on a highly sub-wavelength scale at large relative magnitudes, is proposed to be used as a measurement scale, or "optical ruler". The positions and/or separations of the features of the local wave vector distribution are identified and used as reference points for nanoscale metrology, allowing dimensions of an object or an amount of an object's movement or displacement to be determined by comparing the object and its position against the local wavevector distribution, in a similar manner to the use of known divisions on a physical ruler to determine conventional measurements.

The ability to generate, project and magnify the interferometric superoscillatory field in the optical far field removes the requirement for near-field sensors proximate to the object that restricts known nanoscale metrology techniques. This greatly enhances the flexibility and applicability of the method, giving a contactless measurement technique which requires no interaction with the object other than its appropriate placement for illumination with the superoscillatory field. Furthermore, the inherent generation of an interferometric field when a suitable metasurface transmits light greatly increases stability to mechanical and thermal effects compared to conventional interferometric metrology systems previously proposed for nanoscale measurements. Compared to current nanoscale metrology, the proposed technique can offer a generally more universally applicable super-resolution metrology for applications such as semiconductor lithography and luminescent-label-free cellular studies.

Figure 10:
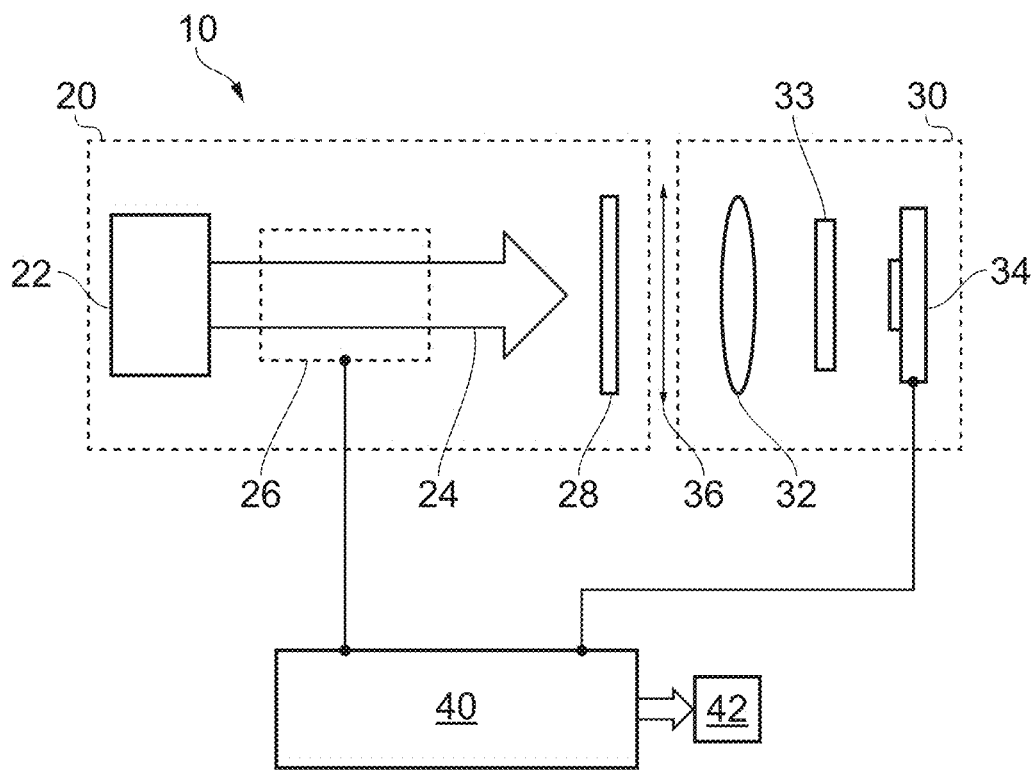
FIG. 10 shows a schematic representation of apparatus suitable for performing metrology using an interferometric superoscillatory field according to examples disclosed herein.

FIG. 10 shows a schematic and highly simplified side view of an example apparatus suitable for carrying out optical metrology according to the present disclosure. The apparatus 10 comprises a first part or platform 20 and a second part or platform 30. The first part 20 comprises an optical source (laser) 22 operable to generate a coherent planar output light wave or beam 24. The optical source should preferably have a narrow line-width for good coherence. The light wave 24 is passed through a polarization controller 26 operable to convert the light wave 24 into different (arbitrary) polarisation states. In particular, these can include linear polarisations aligned along the x, y and ±45° orientations (and optionally other orientations depending on the configuration of the metasurface) and left and right circular polarisations, as discussed above. A plurality of waveplates (for example, a cascade of a quarter-waveplate, a half-waveplate and a quarter-waveplate) can be used to create the various polarisation states, as will be understood by the skilled person. The waveplates may be tunable waveplates which are able to be tuned electronically, in order to enable rapid switching between the desired polarisation states.

Finally, the first part 20 includes a metasurface 28 as described above, configured for the generation of an interferometric superoscillatory field by transmission of the light wave 24 through the metasurface 28. The superoscillatory field is formed on the downstream, transmission side of the metasurface, opposite to the input side facing the laser 22.

The second part 30 comprises a magnification system 32 comprising one or more lenses, which is aligned to collect the superoscillatory field preferably in the plane parallel to the metasurface (x-y plane) in which one or more of the phase singularities are situated, and project the superoscillatory field onto an optical detector 34 located in the far field. The magnification system may be a high magnification lens system, operable to provide magnification in the range of 500 to 2500 times, for example. The detector 34 may be a CCD (charge coupled device) camera or array, or a CMOS (complementary metal-oxide-semiconductor) device, for example. The detector 34 is operable to record and detect intensity profiles of the superoscillatory field as imaged by the magnification system 32. A polarizer 33 is included after the magnification system 32 and prior to the detector 34, in order to select the desired appropriately polarised component of the light transmitted by the metasurface 28 for detection, as described above. For example, a y-polariser will select the superoscillatory field which is generated with a y-polarisation from illuminating the metasurface with x-polarised light.

The apparatus 10 may be controlled by a processor or similar controller or control unit 40. The controller 40 communicates with and controls (by wired or wireless connections) the polarization controller 26 and the detector 34, in order to switch the light wave 24 between the multiple polarisation states required for the extraction of phase information from the intensity distribution of the interferometric superoscillatory field (as described above), and control the detector to record the intensity distributions generated from each polarisation state. The processor can then receive the detected intensity distributions.

In order to carry out metrology, the two parts 20 and 30 are arranged for relative lateral movement or translation 36 along a direction in the x-y plane, that is, along a direction orthogonal to the direction of the optical path through the metasurface 28 (propagation direction z of the light wave). This can be implemented by mounting one or other of the parts 20, 30 on an item, object or component whose position or displacement along that direction is required to be measured. The other of the parts 20, 30 is maintained stationary. To perform a measurement, a set of intensity profiles at multiple polarisations is obtained at a first lateral position between the parts 20, 30, and a further set of intensity profiles at multiple polarisations is obtained at a second lateral position between the parts 20, 30, the second lateral position being arrived at after some displacement along the lateral direction 36. For each set of intensity profiles, a local wavevector profile is extracted using equation 1 to determine the corresponding phase profiles, from which the local wavevector profiles are determined. The two local wavevector profiles can then be compared to determine the relative positions of the peaks/features. Since the width of the peaks and the separation of adjacent peaks is known (taking into account the level of magnification), the shift in position of a peak from one profile to the other is the same as the size of the displacement between the first and second lateral positions. Hence, the displacement can be calculated.

The controller 40 can perform the various processing steps to extract the local wave vector profiles and compare them to ascertain if any displacement has occurred between the first and second lateral positions (lateral displacement), and optionally also to determine or calculate the magnitude of any lateral displacement which is detected as having occurred. The result can be provided as an output 42, which may in the form of an absolute or relative value indicating the size or magnitude of the displacement, or an alarm indicating that a displacement has occurred (to monitor for unwanted displacement, for example), or an alert that a desired displacement had been achieved (to monitor an ongoing displacement process, for example). The form of the output 42 will depend on the nature of the metrology application, and various formats will be apparent to the skilled person; the invention is not limited in this regard.

Acquisition of sets of intensity profiles can be made at specified times between which a displacement is known to have taken place, in order to measure the magnitude of that displacement. Alternatively, sets of intensity profiles can be collected on a continuous, on-going, basis, for example at regular time intervals, and the local wavevector profiles from each set compared over time in order to detect if and/or when a displacement has taken place. Each profile could be compared to a first profile or to an immediately preceding profile, for example, or to a standard or reference profile acquired and stored in advance of a monitoring process during which data is continuously acquired.

Figure 11:
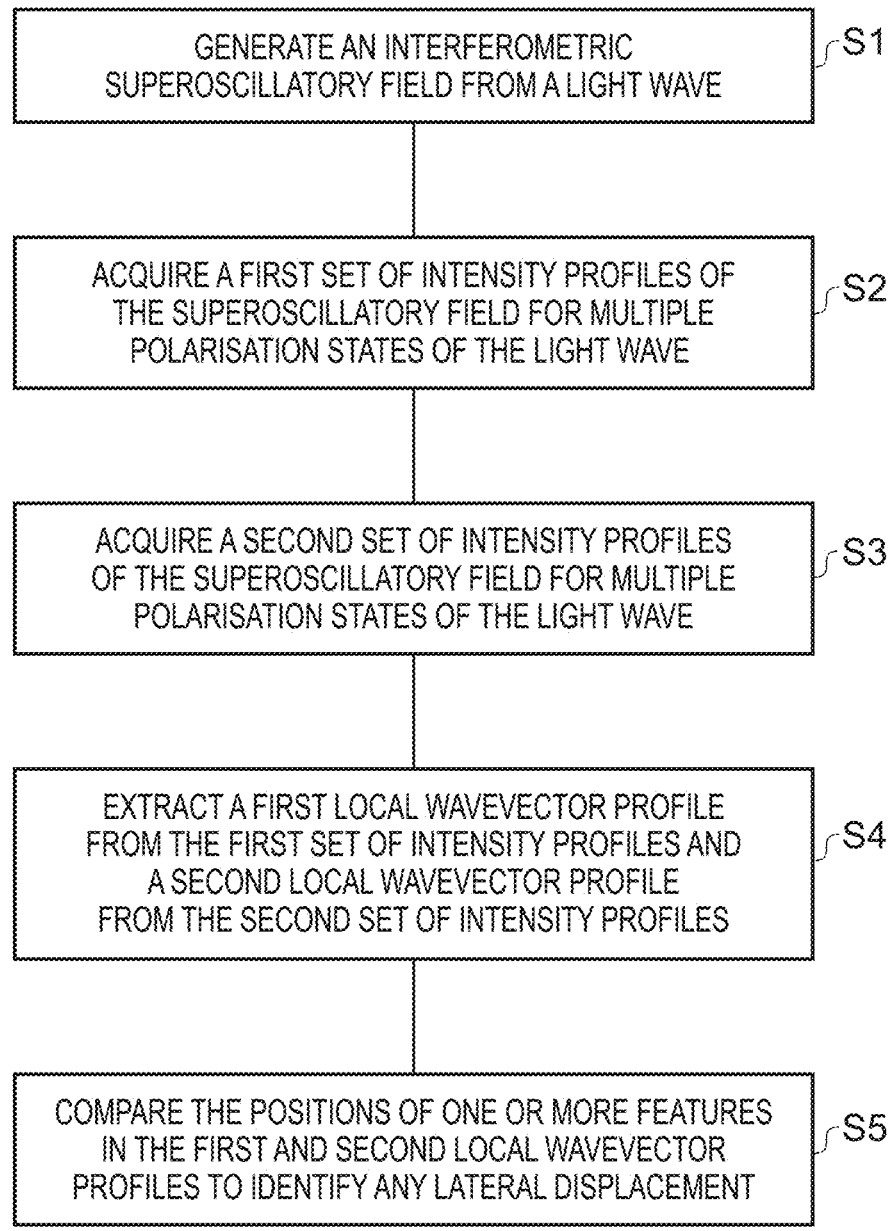
FIG. 11 shows a flow chart of steps in an example method of metrology according to examples disclosed herein.

FIG. 11 shows a flow chart of steps in an example metrology method according to the disclosure.

In a first step S1, an interferometric superoscillatory field (superoscillatory interference pattern) is generated, for example by transmission of a coherent plane light wave through a metasurface in order to generate a reference wave and a superoscillatory field which combine to create the interference pattern, as described above.

In a second step S2, a first set of intensity profiles of the interferometric superoscillatory field is acquired, where the set comprises an intensity profile for each of multiple polarisation states of the light wave. The multiple polarisation states may be four states: left circular polarisation, right circular polarisation, and two orthogonal linear polarisations. The orientation of the linear polarisations should be chosen according to the configuration of the metasurface. For example, ±45° polarisations can be used for a Pancharatnam-Berry metasurface or other metasurface comprising nanoscale features such as slits oriented at ±45°. The intensity profiles are measured in the optical far field from the metasurface, each at the same distance from the metasurface, and in a plane parallel to the plane of the metasurface and orthogonal to the propagation direction of the light wave through the metasurface. The profiles may be one dimensional only, that is, along a line in the plane, or may be two-dimensional, across the plane.

In a third step S3, a second set of intensity profiles of the interferometric superoscillatory field is acquired, for the same polarisation states as the first set, and at the same far-field distance from the metasurface.

In a fourth step S4, a first local wavevector profile is extracted from the first set of intensity profiles, and a second local wavevector profile is extracted from the second set of intensity profiles. This is achieved by use of equation 1 (or a similar equation according to the polarisation states used) to determine the phase profile for each set of intensity profiles, followed by calculation of the corresponding local wavevector from the curl of the phase, as explained above.

In a fifth step S5, the two wavevector profiles are compared, for the purpose of identifying any difference in position of one or more features (peaks in the profile, corresponding to the positions of phase singularities in the superoscillatory field) in the profiles. Any positional difference indicates that a lateral movement, that is movement in a direction parallel to the plane of the metasurface (and along a direction encompassed by the local wavevector profiles) between the metasurface (and hence also the interferometric superoscillatory field) and optical detection apparatus used to image, project and record the intensity profiles, has occurred between the time at which the first set of intensity profiles was acquired and the time at which the second set of intensity profiles was acquired. Hence, the presence of a lateral movement or displacement can be identified. Additionally, the magnitude of the lateral displacement can be determined, since the scale of the features and their positions within the local wavevector profiles is a known quantity.

Figure 12A:
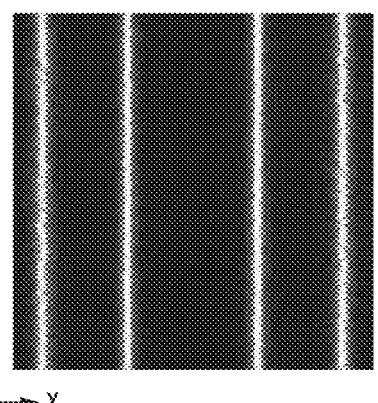
FIG. 12A shows an image of a local wavevector profile extracted from measurements of a superoscillatory field.

FIG. 12 presents some experimental results. FIG. 12A shows a local wavevector profile of a superoscillatory field, determined from multiple intensity profiles imaged in the x-y plane at the location of the phase singularities. The superoscillatory field was generated from a metasurface with a homogenous structure in the vertical, y, direction, so the wavevector profile comprises vertical stripes, as discussed above. The stripes can be used as markings for measurement, equivalently to the divisions on a physical ruler. The striped pattern indicates that one-dimensional measurements in the x-direction are possible only. Accordingly, in a metrology procedure there is no need to record two-dimensional profiles in the x-y plane. Instead, a one-dimensional, linear profile comprising a line of intensity measurements along the x-direction can be detected instead. This increases the speed of data acquisition and processing, giving a metrological output more quickly.

Figure 12B:
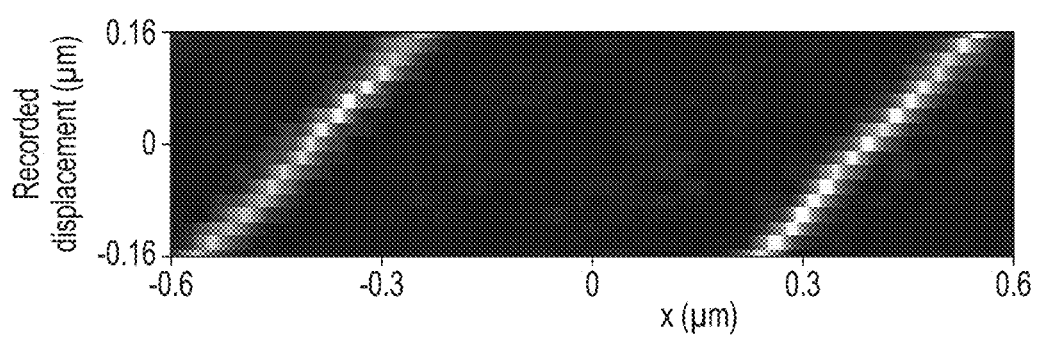
FIG. 12B shows images of multiple wavevector profiles determined for different lateral displacements in a metrology apparatus according to examples disclosed herein.

FIG. 12B shows a set of one-dimensional local wavevector profiles obtained from intensity profiles recorded at successive lateral displacement positions. This may be achieved by effecting step-wise lateral movements 36 with apparatus such as the apparatus 10 of FIG. 10. The part 20 comprising the laser and the metasurface may be moved while the part 30 comprising the magnification system and the detector remains fixed, for example. A set of intensity profiles is acquired for each lateral position, and a local wavevector profile derived from each set. FIG. 12B shows the local wavevector distribution along the x-direction over the two central peaks or stripes, for each of multiple lateral displacements between −0.16 μm and 0.16 μm. As can be appreciated, the position of the peaks changes with the displacement; the lateral movement causes the peaks to scan over the detector surface. Accordingly, the magnitude of any displacement that occurs between the acquisition of data for two local wavevector profiles can be determined from the known dimensions of the intensity and wavevector distributions.

FIG. 13 presents further experimental results together with theoretical simulations, in order to demonstrate the measurement resolution that can be achieved with super-resolution optical metrology as described herein. For both the experimental measurements and the computer-simulated measurements, the interferometric superoscillatory field was generated using a planar Pancharatnam-Berry phase metasurface illuminated with the output of a semiconductor laser operating at a wavelength of $\lambda=800$ nm. The interferometric superoscillatory field was imaged onto the detector without any loss of resolution by using a lens with a numerical aperture higher than the numerical aperture of the metasurface. A 1300× magnification optical system was used to projecting the image on a sensor (optical detector) with a pixel size of 6.5 μm, thus achieving an effective pixel resolution of 5 nm in the plane of observation.

FIG. 13C shows the computer simulation of an intensity profile or distribution of the interferometric superoscillatory field, while FIG. 13E shows the computer simulation of the corresponding local wavevector profile, normalised to the free-space wavevector ($|k_{local}|/k_0$). FIG. 13G shows an experimental intensity profile and FIG. 13I shows the normalised local wavevector distribution extracted from the experimental intensity profile plus other profiles in a set measured for different polarisation states.

In order to evaluate the practically achievable resolution, the optical source (and polarisation controller) and the metasurface were mounted on a movable platform that enabled lateral translation of the interferometric superoscillatory field relative to the magnifying lens and the detector. The platform was moved in nanometre-scale steps through multiple relative lateral displacements between the field and the detector, and appropriate sets of four intensity profiles (±45° linear polarisation, and left and right circular polarisation) were recorded at each displacement, followed by determination of the corresponding local wavevector profiles.

Figure 13A:
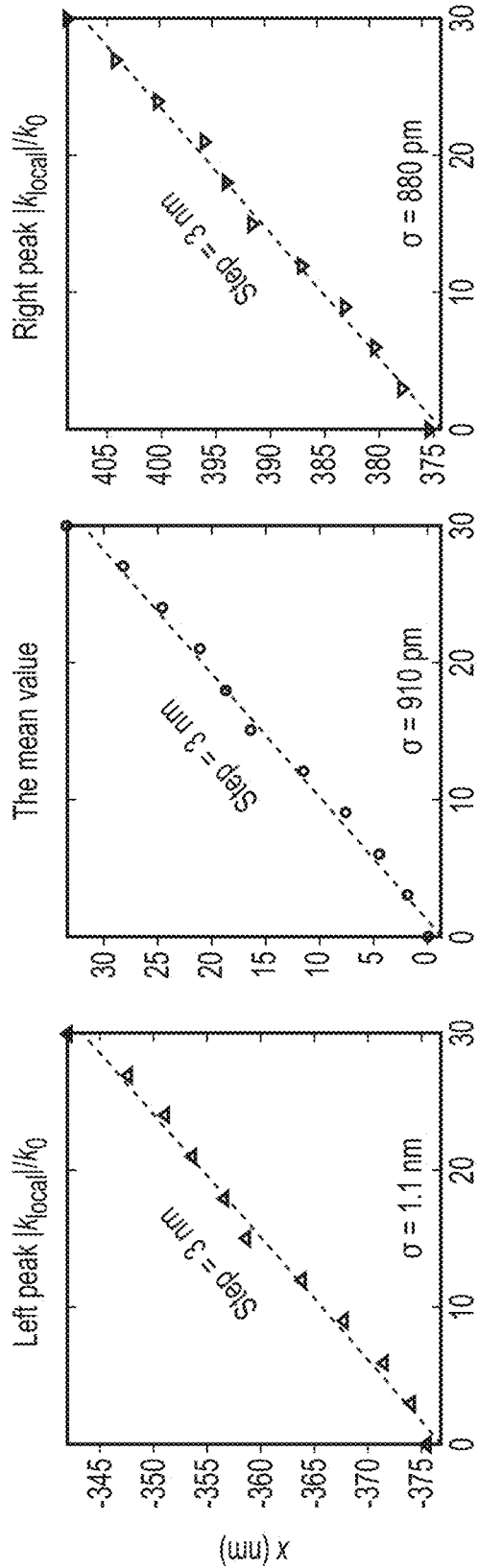
FIGS. 13A and 13B show graphs of the variation of local wavevector peak positons within a profile with measured lateral displacement in a metrology apparatus, for different ranges and steps of displacement.
Figure 13B:
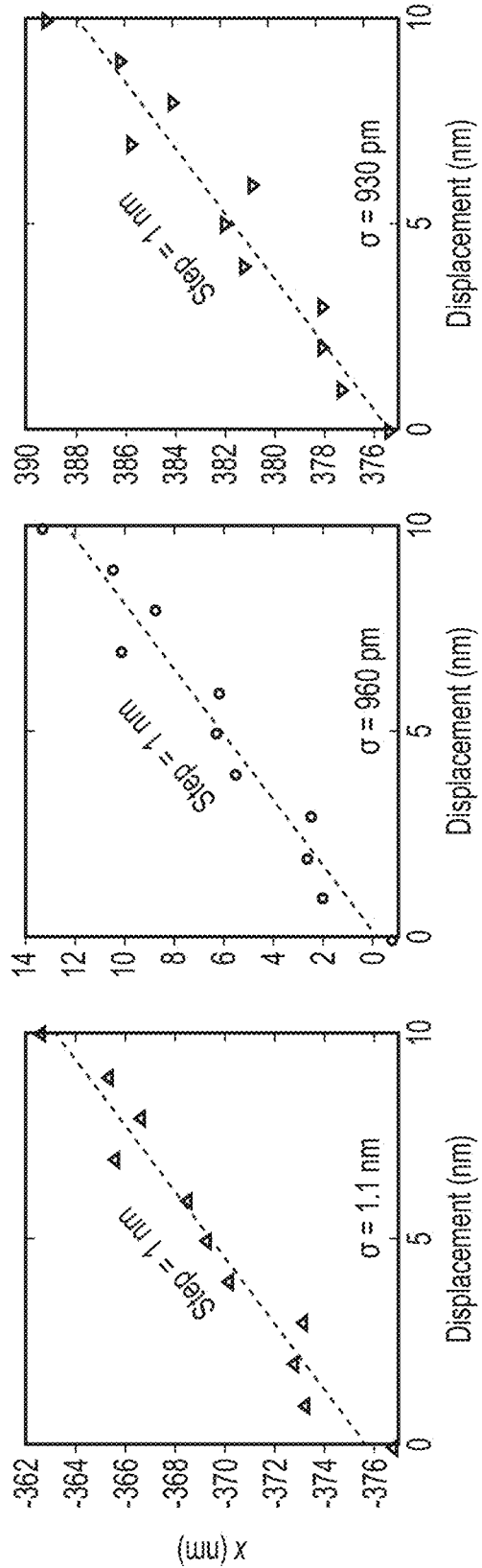

FIG. 13A shows three graphs of the recorded displacement (x-axis) against the measured position of a feature in the local wavevector profile at each displacement (y-axis). The left-hand graph shows the position of a left-hand peak in the profile, the right-hand graph shows the position of a right-hand peak in the profile, and the central graph shows the mean value of the peak positions. A total displacement of 30 nm was covered in 3 nm steps. FIG. 13B shows three further graphs of recorded displacement against feature position, for a total displacement of 10 nm covered in 1 nm steps. Linear regression analysis was carried out for each set of data points, as indicated by the dotted lines on the graphs. This shows that the relationship between actual displacement and measured feature position has a unitary slope and a standard deviation of less than 1 nm (indicated by the values of standard deviation a on each graph). Accordingly, the displacement resolving power of the "optical ruler" is determined to be better than $\lambda/800$.

The measured resolving power of about 1 nm was limited by a resolution of 0.4 nm of the piezo-electric actuator used to move the platform, by mechanical instability in the setup, and by pixelation of the image sensor. To further evaluate the potentially achievable resolution of the metrology, the autocorrelation functions of the computer simulated and experimentally measured intensity profiles (FIGS. 13C and 13G), and of the computer simulated and experimentally determined local wavevector profiles (FIGS. 13E and 13I) were calculated. Such autocorrelation functions allow a universal estimate of how well an original (undisplaced) and a displaced image can be distinguished or resolved, with the resolving power being evaluated as the width of the autocorrelation function at 80% of its height. The autocorrelation functions are shown in FIG. 13 under their corresponding profiles/distribution. Hence, FIG. 13D shows the autocorrelation function for the computer simulated intensity profile, FIG. 13F shows the autocorrelation function for the computer simulated local wavevector profile, FIG. 13H shows the autocorrelation function for the experimental intensity profile and FIG. 13J shows the autocorrelation function for the experimental local wavevector profile. For the intensity profiles having intensity I, the autocorrelation functions $G_I(\delta x)$ are wide and bell-shaped, giving a resolution of 249 nm (corresponding to $0.31\lambda$ for the 800 nm wavelength used) from the computational data, and 269 nm ($0.34\lambda$) from the empirically measured data. In contrast, a much better resolving power can be achieved by using the local wavevector distribution as the scale on the "optical ruler", rather than the intensity distribution. The autocorrelation functions $G_k(\delta x)$ for the local wavevector profiles with value k decay rapidly and so are much narrower, being exponential at small distances. From these, a resolution of about 190 pm ($\lambda/4200$) is estimated from the computer simulated data, and a resolution of about 1.7 nm ($\lambda/470$) is evaluated from the experimental data. This latter value is close to the value of the standard deviation a obtained from the displacement measurements shown in FIGS. 13A and 13B.

The radical improvement in resolution obtainable by observing a local wavevector profile in preference to the original intensity profile arises not only from the dramatic difference in the width of the features or peaks in the profiles (the local wavevector peaks being significantly narrower), but also by the different nature of the shape of the peaks. This is readily apparent from the autocorrelation functions, in which the intensity profile autocorrelation $G_I(\delta x)$ has a smooth bell shape that decays much more gradually than the exponentially localised autocorrelation $G_k(\delta x)$ of the local wavevector profile. Accordingly, both experiments and computer simulations indicate the ability of the local wavevector profile of a superoscillatory field to provide very high resolution metrology, orders of magnitude in excess of resolution levels indicated by the Abbe-Rayleigh rule. The results show that a displacement resolving power of about $\lambda/4000$ (such as 100 pm resolution for light at a wavelength of 400 nm) is potentially achievable. This provides metrology on a truly atomic scale. Suitable configuration of the apparatus can be aimed at providing the resolution indicated by simulation, taking into account various factors. For example, narrower wavevector peaks can be obtained from monochromatic light. Also, the wavevector peaks tend to be located in areas of low intensity, which can be exacerbated by the use of high magnification to project the superoscillatory field onto the optical detector with the aim of increasing the resolution, since this reduces the intensity of the light delivered to the detector. Accordingly, the bandwidth of the optical source and the noise level at the optical detector will impact the resolution. To achieve the maximum predicted resolving power of $\lambda/4000$, it is proposed that ultra-stable opto-mechanical devices could be used, similar to that used in scanning tunnelling microscope (STM) instruments that can achieve atomic-level resolution. Also, higher magnification levels that those mentioned above could be used to reduce pixelation so that this is not a limiting factor on the resolution.

As discussed above with regard to FIG. 9, a suitably configured metasurface can generate an interferometric superoscillatory field that, in the x-y plane, has an intensity which is spatially variant in both directions. A field of this type can be used for metrology in the same way as has been described for an interferometric superoscillatory field that has a varying intensity profile in one direction only. The more complex field can be used to make measurements in two dimensions, that is, any movement or displacement in directions parallel to the x-y plane. This is in contrast to the examples thus far that enable metrology along a single dimension (being the x-direction in the examples, but the y-direction could be used if the metasurface is appropriately oriented).

FIG. 14 illustrates potential resolution available for two-dimensional metrology. FIG. 14A shows an x-y plane intensity profile of an interferometric superoscillatory field generated by illumination of a random two-dimensional Pancharatnam-Berry phase metasurface (an example of which is shown in FIG. 8) with light at a wavelength of 800 nm. The intensity profile was measured in free space at a distance of about 10 µm from the metasurface. By obtaining multiple intensity profiles for different polarisations of the illuminating light wave, as already described, the phase profile or distribution of the field can be extracted, from which the profile of the local wavevector can be retrieved. This is shown in FIG. 14B. The two-dimensionally variant nature of the intensity distribution yields a two-dimensional local wavevector profile. The intensity profile comprises a plurality of hot spots, leading to a phase profile with a high density of phase singularities, so that the local wavevector profile includes many narrow features, with widths of the nanometre scale. FIG. 14B indicates example features with widths of 22 nm, 5.5 nm and 0.3 nm.

FIG. 14C shows a plot of a cross-section of the autocorrelation function of the local wavevector k along the x direction of the x-y plane, $G_k(\delta x)$, and FIG. 14D shows a plot of a cross-section of the autocorrelation function of the local wavevector k along the y direction of the x-y plane, $G_k(\delta y)$. As with the one-dimensional case (FIG. 13), the autocorrelation function decays rapidly on the nanometre scale, and is exponential at small distances. This gives an achievable displacement resolution (width of the autocorrelation function at 80% height) of about 2.2 nm. For the 800 nm light used, this corresponds to a resolution of about $\lambda/360$. While this is a lower resolution that is available in one dimension, it is still significantly below the diffraction limit, so that a two-dimensional "optical ruler" based on the local wavevector of a superoscillatory field is still useful. Note also that the resolution is the same in both the x and y directions, so that all measurements made in the x-y plane will be comparable. The lower resolution can be attributed to the use of a metasurface (superoscillatory generator) that creates a pattern of wavevector peaks of diverse width, as indicated in FIG. 14B.

Overall, considering the options of both one dimensional and two dimensional metrology, the proposed methods are able to deliver measurement and displacement monitoring with resolution in the range of about $\lambda/300$ to $\lambda/4000$, where $\lambda$ is the wavelength of the light used to generate the interferometric superoscillatory field.

In addition to the improved resolution available from these metrology techniques using superoscillatory fields, apparatus suitable for implementing the metrology is amenable to significant miniaturisation compared with existing metrology systems (such as interferometric arrangements) that require bulk optical components. The metasurface may have dimensions of about 40 µm by 40 µm, as already noted, although smaller or larger metasurfaces are not precluded. This allows a metasurface to be mounted on the end surface of an optical fibre.

Figure 15:
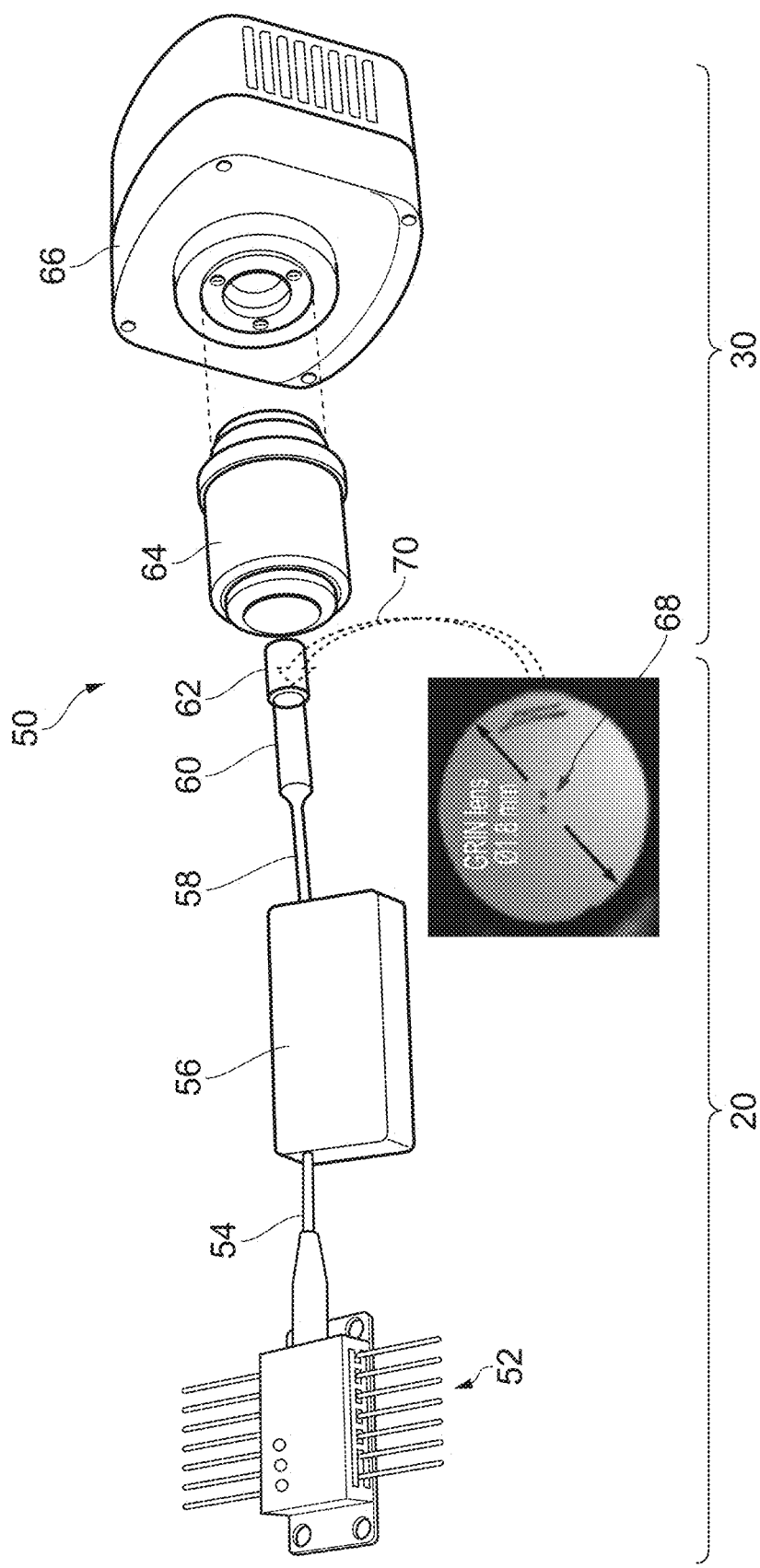
FIG. 15 shows a perspective side view of example apparatus suitable for generating and detecting an interferometric superoscillatory field for use in metrology methods described herein.

FIG. 15 shows a perspective view of an apparatus configured to generate, and obtain intensity distributions of, a superoscillatory field which is suitable for use in aspects of the present invention. The apparatus 50 comprises a first part 20 and a second part 30, arranged for relative lateral movement in a plane orthogonal to the optical propagation direction, in the manner described with regard to FIG. 10. The first part 20 comprises a laser diode 52 operable to generate a planar coherent light wave or beam, with its output coupled into an optical fibre 54. The optical fibre 54 delivers the beam to a polarisation controller 56 configured to switch the incident beam between different polarisation states such as the four states needed for phase retrieval. The beam output by the polarisation controller 56 is carried by a further length of optical fibre 58 to a portion of graded index optical fibre 60 (GRIN fibre) which focuses the beam onto a metasurface 68 provided on the end surface of a further portion of GRIN fibre 62 of larger diameter (such as 1.8 mm). This GRIN fibre 62 delivers the superoscillatory field formed by the metasurface 68 into a far field location 70 where it can be detected. The second part 30 of the apparatus 50 comprises a lens arrangement 64 (comprising one or more lenses) which collects and magnifies the wavefront of the field and projects it to a CCD array 66 for detection of the intensity distribution, in one or two dimensions as discussed above. A polariser (not shown) may be interposed somewhere between the metasurface 68 and the detector 66 in order to select the polarisation component of interest, such as the y component discussed above.

The apparatus of FIG. 15 is merely an example, and the various components can be configured and embodied in any way apparent to the skilled person.

The ability to provide a metasurface on the tip of an optical fibre allows substantial miniaturisation of metrology apparatus, which makes it suitable for numerous applications where high resolution, small size and non-contact operation are important, including monitoring displacements of scanning stages in atomic force microscopes, scanning tunnelling microscopes and super-resolution optical microscope, the alignment of lithography masks, and the control of motion of tools in nano-assembly procedures. An optical metrology device or optical ruler as described may also be placed on nano-indenter heads to measure parameters such as the modulus of elasticity, yield stress, hardness and wear resistance of materials, and attached to a cutting tool of a smart manufacturing lathe or milling machine for position control. Such a device is also suitable for monitoring of relative nanoscale displacements of parts of precision constructions, such as large optical telescopes, disc drives, micro-electro-mechanical systems (MEMS) and nano-electro-mechanical systems (NEMS) devices and acceleration sensors, and for monitoring for deformation, cracking, fatigue or thermal expansion of components. Other applications where super-resolution nanoscale measurement and/or monitoring are also contemplated, and will be apparent to the skilled person.

Metasurfaces other than those described thus far may alternatively be used, where there is capability to generate an interferometric superoscillatory field. Other superoscillatory field generators include ring nanostructures, structured dielectric surfaces and spatial light modulators (SLMs). Any other superoscillatory field generators of which the skilled person is aware may also be used.

Also, the metrology methods are not limited to optical wavelengths (typically visible light with wavelengths from about 400 nm to 700 nm, plus infrared and ultraviolet light, covering a total wavelength range from about 100 nm (near ultraviolet) to about 100 μm (mid and far infrared). Electromagnetic radiation of other wavelengths may alternatively be used, from microwaves (typically with wavelengths from about 1 mm to 1 m) to x-rays and extreme ultraviolet (typically with wavelengths from about 0.01 nm to 100 nm). Furthermore, the same principles can be implemented with electron beams and acoustic waves; the techniques are not limited to electromagnetic radiation.

Some details regarding "optical ruler" metrology can be found in [9].

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] Z Bomzon, G Biener, V Kleiner, E Hasman, "Space-variant Pancharatnam-Berry phase optical elements with computer generated subwavelength gratings", Opt. Lett. 27, 1141-1143 (2012)

[2] D Lin, P Fan, E Hasman, M L Brongersma, "Dielectric gradient metasurface optical elements", Science 345, 298-302 (2014)

[3] U.S. Pat. No. 9,606,415

[4] E T F Rogers and N I Zheludev, "Optical super-oscillations: sub-wavelength light focusing and super-resolution imaging", J. Opt. 15, 094008 (2013)

[5] K S Rogers, K N Bourdakos, G H Yuan, S Mahajan, E T F Rogers, "Optimising superoscillatory spots for far-field super-resolution imaging", Opt. Express 26(7), 8085-8112 (2018)

[6] G H Yuan, S Vezzoli, C Altuzarra, E T F Rogers, C Soci, N I Zheludev, "Quantum super-oscillation of a single photon", Light Sci. Appl. 5, e16127 (2016)

[7] E T F Rogers, J Lindberg, T Roy, S Savo, J E Chad, M R Dennis, N I Zheludev, "A super-oscillatory lens optical microscope for subwavelength imaging", Nat. Mater. 11, 432 (2012)

[8] G H Yuan, E T F Rogers, N I Zheludev, "'Plasmonics' in free space: observation of giant wavevectors, vortices and energy backflow in superoscillatory optical fields", Light Sci. Appl. 8, 2 (2019)

[9] N. Zheludev, "Nanophotonics of superoscillations: imaging and metrology applications", Nature Conference on Nanophotonics and Integrated Photonics, Nanjing, China, 9-11 Nov. 2018

The invention claimed is:

1. A method of determining a displacement, comprising: generating an interferometric superoscillatory field from coherent electromagnetic radiation, the interferometric superoscillatory field comprising an interference pattern between a reference field and a superoscillatory field;

detecting with a detector a first set of intensity distributions of the interferometric superoscillatory field, each intensity distribution from a different polarisation state of the electromagnetic radiation;

detecting with the detector a second set of intensity distributions of the interferometric superoscillatory field, each intensity distribution from the same polarisation states of the electromagnetic radiation as the first set of intensity distributions;

extracting a first local wavevector distribution from the first set of intensity distributions and a second local wavevector distribution from the second set of intensity distributions;

comparing the first local wavevector distribution and the second local wavevector distribution to identify any change in position of one or more features in the local wavevector distributions; and ascertaining that a lateral displacement has occurred between the interferometric superoscillatory field and the detector if a change in position is identified.

2. A method according to claim 1, further comprising determining a magnitude of the lateral displacement from dimensions of one or more features in the local wavevector distributions.

3. A method according to claim 1, in which, for each set of intensity distributions, the different polarisation states comprise left circular or elliptical polarisation, right circular or elliptical polarisation, and two orthogonal linear polarisations.

4. A method according to claim 1, in which the interferometric superoscillatory field has an intensity distribution that varies transversely in one dimension only, the lateral displacement being ascertainable in this dimension.

5. A method according to claim 1, in which the interferometric superoscillatory field has an intensity distribution that varies transversely in two dimensions, the lateral displacement being ascertainable in a plane occupied by the two dimensions.

6. A method according to claim 1, in which the coherent electromagnetic radiation is optical radiation.

7. A method according to claim 1, in which generating the interferometric superoscillatory field comprises passing the coherent electromagnetic radiation through a nanostructured metasurface configured to create a plane wave and a superoscillatory field which interfere to generate the interferometric superoscillatory field, the plane wave being the reference field.

8. A method according to claim 1, comprising generating the interferometric superoscillatory field with a first part of an apparatus, detecting the first and second sets of intensity distributions with a second part of the apparatus able to be laterally displaced from the first part, and locating either the first part or the second part on a component so that a lateral displacement of the component can be ascertained.

9. An apparatus for determining a displacement comprising:

a first part comprising a superoscillatory field generator configured to generate an interferometric superoscillatory field from coherent electromagnetic radiation with any of multiple polarisation states, the interferometric superoscillatory field comprising an interference pattern between a reference field and a superoscillatory field;

a second part comprising a detector configured to detect an intensity distribution of the interferometric superoscillatory field, the second part able to be laterally displaced from the first part; and a processor configured to:
receive intensity distributions detected by the detector comprising a first set of intensity distributions each from a different polarisation state of the electromagnetic radiation and a second set of intensity distributions from the same polarisation states of the electromagnetic radiation as the first set of intensity distributions;

extract a first local wavevector distribution from the first set of intensity distributions and a second local wavevector distribution from the second set of intensity distributions;

compare the first local wavevector distribution and the second local wavevector distribution to identify any change in position of one or more features in the local wavevector distributions; and ascertain that a lateral displacement has occurred between the first part and the second part if a change in position is identified.

10. An apparatus according to claim 9, in which the superoscillatory field generator comprises a nanostructured metasurface configured to transmit the coherent electromagnetic radiation to create a plane wave and a superoscillatory field which interfere to generate the interferometric superoscillatory field, the plane wave being the reference field.

11. An apparatus according to claim 10, in which the first part comprises a laser operable to output the coherent electromagnetic radiation.

12. An apparatus according to claim 11, in which the first part comprises optical fibre to carry the output of the laser to the nanostructured metasurface, the nanostructured metasurface being disposed on an end face of a portion of optical fibre.

13. An apparatus according to claim 9, in which the first part comprises a polarisation controller operable to impart each of the different polarisation states to the coherent electromagnetic radiation.

14. An apparatus according to claim 13 in which the different polarisation states comprise left circular or elliptical polarisation, right circular or elliptical polarisation, and two orthogonal linear polarisations.

15. An apparatus according to claim 9, in which the second part comprises a magnification system to project the interferometric superoscillatory field onto the detector.

16. An apparatus according to claim 15, in which the magnification system has a magnification in the range of 500 times to 2500 times.

17. An apparatus according to claim 9, in which the processor is further configured to determine a magnitude of the lateral displacement from dimensions of one or more features in the local wavevector distributions.

18. An apparatus according to claim 9, in which the processor is able to ascertain that a lateral displacement has occurred with a resolution in the range of $\lambda/300$ to $\lambda/4000$, where $\lambda$ is the wavelength of the coherent electromagnetic radiation.

19. An apparatus according to claim 9, in which the detector is polarisation-sensitive.

* * * * *